US012718399B2

(12) United States Patent
Andersson et al.

(10) Patent No.: US 12,718,399 B2
(45) Date of Patent: Aug. 25, 2026

(54) ELECTRONIC DEVICE FOR IDENTIFYING AN ANIMAL AND RELATED METHODS

(71) Applicant: DeLaval Holding AB, Tumba (SE)

(72) Inventors: Rickard Andersson, Malmö (SE); Marc Ahlse, Bjärred (SE); John-Henry Markbo, Lund (SE); Johan Wadman, Lund (SE)

(73) Assignee: DeLaval Holding AB, Tumba (SE)

( * ) Notice: Subject to any disclaimer, the term of this patent is extended or adjusted under 35 U.S.C. 154(b) by 276 days.

(21) Appl. No.: 18/427,511

(22) Filed: Jan. 30, 2024

(65) Prior Publication Data

US 2024/0320851 A1 Sep. 26, 2024

(30) Foreign Application Priority Data

Mar. 23, 2023 (SE) .................................... 2350328-7

(51) Int. Cl.
*G06T 7/73* (2017.01)

(52) U.S. Cl.
CPC ...... *G06T 7/73* (2017.01); *G06T 2207/10024* (2013.01); *G06T 2207/10028* (2013.01); *G06T 2207/30108* (2013.01)

(58) Field of Classification Search
CPC ............. G06T 7/73; G06T 2207/10024; G06T 2207/10028; G06T 2207/30108
USPC ......................................................... 382/110
See application file for complete search history.

(56) References Cited

U.S. PATENT DOCUMENTS 6,985,172 B1 * 1/2006 Rigney ............ G08B 13/19691 348/169
11,748,882 B2 * 9/2023 Psota .................. G06V 40/103 382/100
2011/0279650 A1 * 11/2011 Liao ....................... G06V 20/64 348/46
2021/0004577 A1 1/2021 Amat Roldan
(Continued)

FOREIGN PATENT DOCUMENTS

WO WO-2022077113 A1 * 4/2022 ........... G06V 30/147

OTHER PUBLICATIONS

Office Action and Search Report from corresponding Swedish Application No. 2350328-7, mailed on Oct. 11, 2023, 8 pages.
(Continued)

*Primary Examiner* — Gabriel I Garcia
(74) *Attorney, Agent, or Firm* — MEDLER FERRO WOODHOUSE & MILLS PLLC

(57) ABSTRACT

Provided is an electronic device configured to obtain first sensor data from a first sensor of a first type. The first sensor data has two-dimensional image data representative of the bovine animal in an environment. The electronic device is configured to obtain second sensor data from a second sensor of a second type. The second type is different from the first type. The second sensor data is indicative of one or more distances associated with the environment. The electronic device is configured to generate, based on the first sensor data, a first feature vector. The electronic device is configured to generate, based on the second sensor data, a second feature vector. The electronic device is configured to generate, based on the first feature vector and the second feature vector, a third feature vector. The electronic device is configured to identify the bovine animal based on the third feature vector.

19 Claims, 12 Drawing Sheets

(56) References Cited

U.S. PATENT DOCUMENTS

| | | | | |
|---|---|---|---|---|
| 2021/0386035 | A1 | 12/2021 | Liao | |
| 2022/0104463 | A1 | 4/2022 | Spears | |
| 2023/0337636 | A1 | 10/2023 | Shmigelsky | |
| 2024/0260547 | A1 * | 8/2024 | Jung | G06V 20/625 |

OTHER PUBLICATIONS

Okura Fumio et al: "RGB-D video-based individual identification of dairy cows using gait and texture analyses", Computers and Electronics in Agriculture, Aug. 27, 2019 (Aug. 27, 2019), vol. 165, Elsevier, Amsterdam, NL, XP085810708.

* cited by examiner

ELECTRONIC DEVICE FOR IDENTIFYING AN ANIMAL AND RELATED METHODS

RELATED APPLICATION DATA

The present application claims the benefit of Swedish Patent Application No. 2350328-7, Mar. 23, 2023, the content of which is incorporated herein by reference in its entirety.

TECHNICAL FIELD

The present disclosure pertains to the field of image processing, in particular image processing for animal monitoring. The present disclosure relates to an electronic device for identifying an animal in an environment and related method.

BACKGROUND

Identification of an animal plays an important role in animal breeding and animal production systems, allowing producers to keep records on animal information, such as one or more of: a birth date, production records, health history, parentage data, body condition score (such as, body temperature) and any other suitable management information related to an animal. Identification of an animal may be used to control passage of such animal by automatically opening or closing gates based on an individual credential associated with the animal.

SUMMARY

Identification of animals may be performed with passive Radio Frequency Identification, RFID, tags placed in an ear area or on their collars. Reading stations for processing such RFID information are seen as expensive, difficult to move (such as, heavy), and sometimes too large to fit in places where such reading stations might be needed.

Camera-based identification solutions may be more portable, cost effective, and versatile.

Accordingly, there is a need for devices and methods, which may mitigate, alleviate, or address the shortcomings existing and may provide for a more accurate identification of an animal and/or gait analysis of an animal (to identify a dysfunction in a movement of the animal, such as lameness).

An electronic device is provided. The electronic device comprises memory circuitry, processor circuitry, and an interface. The electronic device is configured to obtain first sensor data from a first sensor of a first type. The first sensor data comprises two-dimensional image data representative of a bovine animal in an environment. The electronic device is configured to obtain second sensor data from a second sensor of a second type. The second type is different from the first type. The second sensor data is indicative of one or more distances associated with the environment. The electronic device is configured to generate, based on the first sensor data, a first feature vector. The electronic device is configured to generate, based on the second sensor data, a second feature vector. The electronic device is configured to generate, based on the first feature vector and the second feature vector, a third feature vector. The electronic device is configured to identify the bovine animal based on the third feature vector.

Disclosed is a method, performed by an electronic device, for identifying a bovine animal in an environment. The method comprises obtaining first sensor data from a first sensor of a first type. The first sensor data comprises two-dimensional image data representative of the bovine animal in the environment. The method comprises obtaining second sensor data from a second sensor of a second type. The second type is different from the first type. The second sensor data is indicative of one or more distances associated with the environment. The method comprises generating, based on the first sensor data, a first feature vector. The method comprises generating, based on the second sensor data, a second feature vector. The method comprises generating, based on the first feature vector and the second feature vector, a third feature vector. The method comprises identifying the bovine animal based on the third feature vector.

It is an advantage of the present disclosure that the disclosed electronic device and the disclosed method may enable individual animal identification (such as, to assign an identifier to an animal). The disclosed electronic device and the disclosed method may provide a more accurate identification of an animal, such as a bovine animal, than for example RFID based identification. Individual animal identification may be particularly advantageous for tracking and monitoring each animal of livestock. Further, individual animal identification may be used to control one or more machines, such as a milking machine, a feeding machine and/or other types of machines. The disclosed electronic device may benefit from an improved battery usage while being compact and portable in some examples.

An electronic device is provided. The electronic device comprises memory circuitry, processor circuitry, and an interface. The electronic device is configured to obtain sensor data from a sensor. The sensor data is indicative of one or more distances associated with a bovine animal in an environment. The electronic device is configured to generate, based on the sensor data, a feature vector. The electronic device is configured to generate, based on the feature vector, a gait pattern indicative of a gait of the bovine animal. The electronic device is configured to determine, based on the gait pattern, the lameness parameter indicative of lameness of the bovine animal.

Disclosed is a method, performed by an electronic device, for determining a lameness parameter associated with a bovine animal in an environment. The method comprises obtaining sensor data from a sensor. The sensor data is indicative of one or more distances associated with the bovine animal in the environment. The method comprises generating, based on the sensor data, a feature vector. The method comprises generating, based on the feature vector, a gait pattern indicative of a gait of the bovine animal. The method comprises determining, based on the gait pattern, the lameness parameter indicative of lameness of the bovine animal.

It is an advantage of the present disclosure that the disclosed electronic device and the disclosed method may allow identification of a dysfunction in the gait of an animal, such as a lameness condition associated with the animal, by analysing a gait pattern and/or one or more movement patterns (such as, standing, laying, walking, resting positions) of the animal. The disclosed electronic device and the disclosed method may enable an accurate detection of a dysfunction in a locomotor system of an animal, such as a lameness condition. It may be beneficial for a user (such as a farmer) to get an early notification of the dysfunction.

The disclosed electronic device and the disclosed method may benefit from being carried out in a compact portable device (such as a camera) in some examples while maintaining an improved battery usage as sensor data obtained from one or more sensors (such as, cameras) may be triggered occasionally and processed locally (such as, in a smart camera and/or a computer located near to the one or more sensors).

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
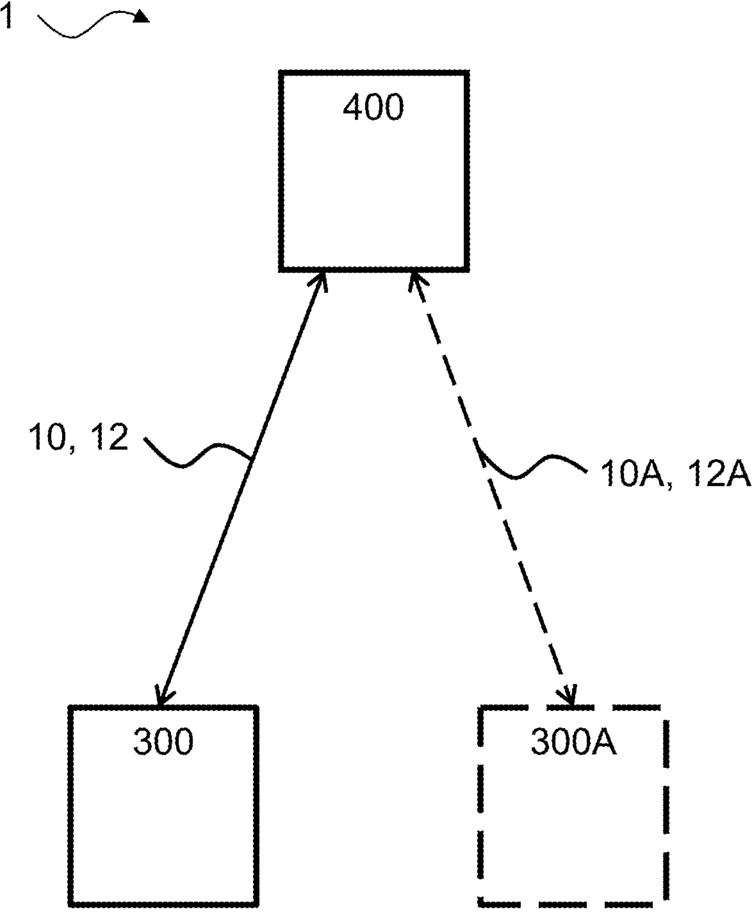
FIG. 1 is a diagram illustrating an example communication system comprising an example remote device and an example monitoring device according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example need not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

Camera-based identification solutions may be more portable, cost effective, and versatile. Animal identification techniques using two dimensional, 2D, imaging (such as, deep learning techniques based on two dimensional, 2D, images) may yield satisfactory performance results, although such performance results are less promising for unicoloured animals (such as, a unicoloured cow). Furthermore, for example, in a farming environment (such as, in a dairy farm) where a camera is configured to record an animal, debris (such as, straw and/or saw dust) may distort the performance results in case such debris occludes a back area of an animal.

The inventors have found that the use of three-dimensional, 3D, cameras (such as depth cameras), when using body shape of an animal as an identifier, is not as affected by debris as 2D cameras. Identification techniques using 3D imaging may outperform identification techniques using 2D imaging in the case of unicoloured animals.

The present disclosure may provide a more accurate identification of an animal by combining 3D with 2D based sensor data. In other words, the present disclosure may relate to techniques using 3D and/or 2D imaging for identifying an animal and/or for gait analysis.

For example, identification of an animal can be advantageous for allowing passage of a bovine animal (such as, a cow) to one or more of a milking machine, a feeding area, and a resting area depending on its needs and previous behaviour.

A feature vector disclosed herein (such as a first feature vector, a second feature vector, and/or a third feature vector) may be seen as a vector comprising numeric and/or symbolic characteristics representative of an object, such as of an animal in the environment. A feature vector may comprise one or more attributes of the object which characterize the object alone or in relation to other objects. In other words, a feature vector may be seen as a vector comprising data indicative of a plurality of features. A feature may be one or more of: a colour component, a length component, a volume component, an area component, a height component, a width component, a depth component, a shape component, a size component, a Gray-level intensity value component, and any other suitable features.

A feature vector may comprise colour components of an object, such as a level intensity value for respective Red Green Blue, RGB, components for describing the object. A feature vector may comprise one or more of a height, a width, and a depth associated with a 3-dimensional, 3D, shape of an object. In the present disclosure, the object is an animal, such as a walking animal, such as an animal for farming, such as one or more of: a bovine animal, an equine animal, and a swine animal. An animal may be one or more of: a cow, a calf, a horse, a goat, a pig, and a sheep. In other words, an animal may be a bovine animal (e.g., cattle), a porcine animal, an equine animal, and/or any other suitable animal breed. The disclosed techniques may be applicable to a swine animal, an equine animal, and/or any other suitable animal breed.

The present disclosure may provide one or more techniques (such as, computer vision techniques) for identifying a body part of an animal and respective space and time coordinates in a 3D point coordinate space. In other words, the present disclosure may allow a more accurate identification of topological and/or morphological features of an animal (such as, body shape, contour of an animal).

A gait pattern disclosed herein may be seen as a pattern characterizing a movement of one or more parts of an animal (such as one or more joints, one or more key points, such as the sacrum of the animal) over time. A lameness parameter disclosed herein may be determined based on the gait pattern.

A lameness parameter may be seen as a parameter to indicate and/or quantify a lameness condition (such as, a limping condition) associated with an animal, in which the animal shows signs of an abnormal gait, such as a dysfunction of the locomotor system. An abnormal gait may include unusual gait patterns and/or uneven weight bearing, and/or one or more of: a tucked abdomen and/or tail, and a hunched back. In some examples, the stance of the animal may be monitored.

The present disclosure may enable a control of machinery adapted for an individual animal. The machinery can be included in a farm management system.

FIG. 1 is a diagram illustrating an example system 1 comprising an example remote device 400, and an example device 300, 300A according to this disclosure.

As discussed in detail herein, the present disclosure relates to a system 1. The system 1 may be one or more of: an animal monitoring system, a farming system, an animal milking system, an abattoir system, a wildlife monitoring system (such as for monitoring bison), and an animal feeding system.

The system 1 described herein may comprise one or more of: device 300, 300A, and/or one or more remote devices 400. The devices 300, 300A may be configured to communicate with the remote device 400 via a wireless link (or radio access link) 10, 10A and/or a wired link 12, 12A.

The device 300, 300A may refer to a monitoring electronic device that may be installed in a barn and/or a facility for monitoring activity of an animal.

The remote device 400 may be installed remotely from a barn and/or a facility for remote monitoring of an activity of an animal. The remote device 400 may be remotely located from, in vicinity of or far away from a barn. The remote device 400 may be one or more of: a back-office device (such as, a computer, a laptop, a PC, a tablet, and/or a mobile phone) and a server device (such as, part of a cloud architecture).

The devices 300, 300A may be useful for directing a bovine animal to a feeding and/or milking and/or resting area. The devices 300, 300A may be part (such as, a subsystem) of a farm management system. The use of devices 300, 300A may enable personalisation of control machinery included in the farm management system.

The electronic devices disclosed herein (such as in FIGS. 9 and 11) may be implemented in a monitoring electronic device such as device 300, 300A, and/or in a remote device, such as remove device 400.

Figure 2:
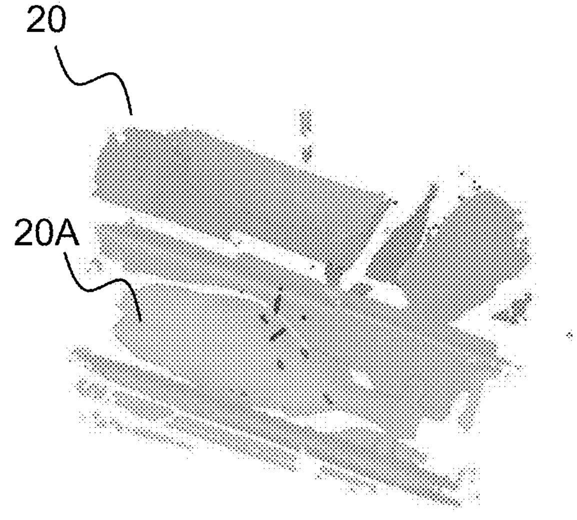
FIG. 2 illustrates an example image representative of three-dimensional sensor data of a bovine animal in an environment according to this disclosure.

FIG. 2 illustrates an example image 20 representative of three-dimensional sensor data of a bovine animal 20A in an environment according to this disclosure. The bovine animal 20A stands or is walking beneath a sensor.

In other words, the example image 20 represents sensor data (such as second sensor data), obtained from a sensor (such as a second sensor of a second type). In FIG. 2, the sensor is a three-dimensional camera, such as time-of-flight, ToF, camera. The image 20 can be seen as a ToF image.

The image 20 may be captured by the sensor being a ToF camera and/or a ToF sensor. The sensor may measure depth and distance by determining, based on ToF, one or more distances between the second sensor and each element of the environment including the bovine animal 20A. In other words, the sensor camera may capture a 3D representation (such as, a 3D shape) of the bovine animal 20A in the environment.

The sensor data (represented by image 20) may be seen as a frame of the bovine animal 20A in the environment. A monitoring electronic device, such as implementing electronic devices 300, 300A of FIG. 1, may obtain a plurality of frames (such as, images) of the bovine animal in 3D. An electronic device (such as, electronic device 300, 300A of FIG. 1) may obtain a plurality of frames (such as, images) of the bovine animal in 3D. The second sensor data may generate and/or provide the plurality of frames of the bovine animal in 3D.

Figure 3:
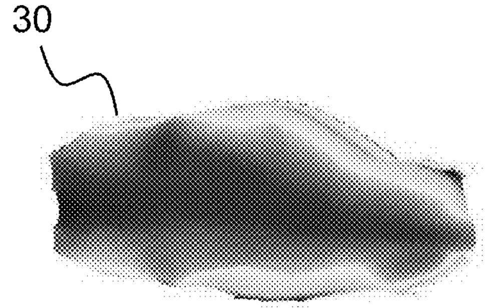
FIG. 3 illustrates an example image representative of three-dimensional sensor data of a part of a bovine animal according to this disclosure.

FIG. 3 illustrates an example image 30 representative of three-dimensional sensor data of a part of a bovine animal 20A in an environment according to this disclosure.

The image 30 may be a seen as a pre-processed version of a first image, such as a cropped version, of the first image, such as image 20 of FIG. 2. In other words, the image 30 may be seen as a second image when the image 20 of FIG. 2 is seen as the first image. The image 30 can be seen as a pre-processed ToF image.

A first image may represent the bovine animal in an environment. An electronic device disclosed herein (such as, electronic device 300, 300A of FIG. 1) may pre-process the first image by removing a background and/or a body part from the first image 20 for provision of the image 30.

A first region of interest (such as, the bovine animal that can be walking and/or standing) may be extracted using a background reference 3D image, such as an image of the same scene as the first image excluding the bovine animal. In other words, the background reference 3D image may be an image without a bovine animal, for example solely including the background environment without the bovine animal present. The background reference image may be regularly updated as the sensor may move slightly over time and/or changes occurring in the environment where the bovine animal is in (such as, the environment surrounding the bovine animal). Put differently, the electronic device(s) disclosed herein may update the background reference image whenever there is a change in the environment surrounding the bovine animal and/or in a field of view (such as, range) of the sensor capturing the first image.

Any remaining elements which may not be removed when performing the background subtraction may be of a relatively small size. In other words, the first region of interest may contain such small size elements which may not belong the bovine animal. The electronic device may remove such remaining elements by applying thresholding techniques to the first region of interest.

The electronic device may pre-process the first image by removing one or more parts of the body of the bovine animal. A second region of interest may be extracted from the first region of interest by removing one or more parts of the body of the bovine animal from the first image. The electronic device may pre-process the first image by aligning a spine area of the bovine animal to an x-axis. The electronic device may remove body part data associated with the parts of the body of the bovine animal after aligning the spine area of the bovine animal. As illustrated in FIG. 3, the electronic device may remove body part data associated with a head, a neck area, a shoulder area, a part of a back area (such as, a hind part), and a tail from the sensor data of the bovine animal (such as second sensor data). The bovine animal may be heading to any direction, such as a right direction, a left direction.

For example, body part data associated with the neck is cropped off by removing body part data (such as image columns) where the number of pixels is below a given threshold. The neck, for example, is relatively thin, and as such, the body is cropped by excluding the neck and/or shoulders, as shown in FIG. 3. For example, in FIG. 3, the body part data removed is associated with the head and neck as well as a portion of the hind part of the bovine animal.

Figure 4:
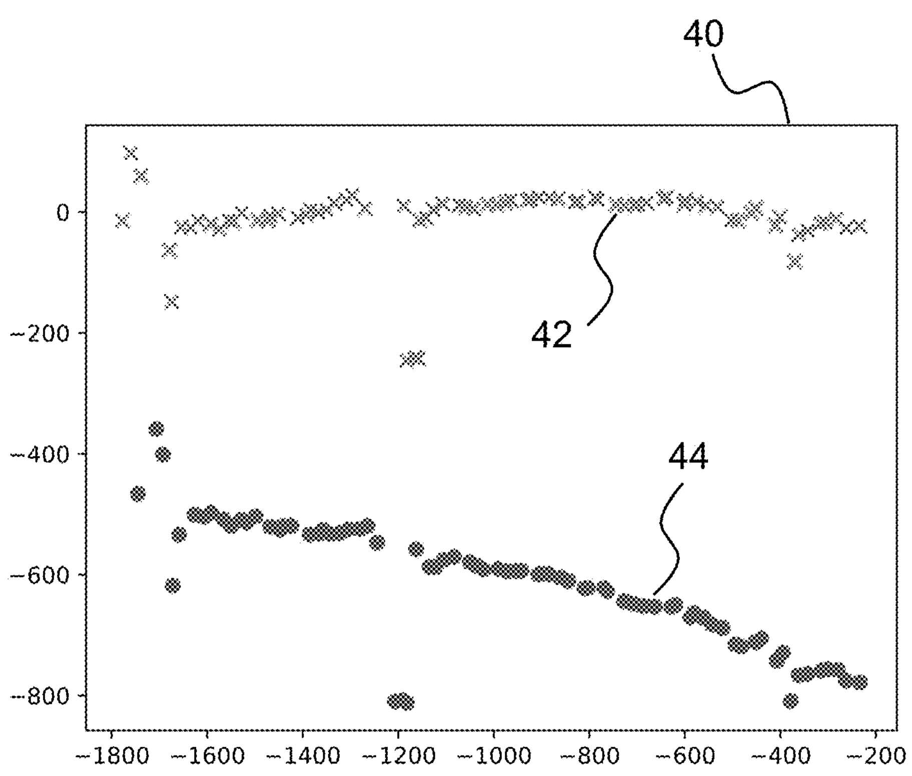
FIG. 4 is a graph illustrating a representation of a plurality of spine points of a bovine animal associated with an example image representative of second sensor data according to this disclosure.

FIG. 4 shows a graph illustrating a representation 40 of a plurality of spine points of a bovine animal associated with an example image representative of sensor data (such as 3D sensor data, such as from a ToF camera, such as second sensor data) according to this disclosure.

The representation 40 of the plurality of spine points may illustrate a process for aligning and/or adjusting a spine area of the bovine animal.

The representation 40 shows a plurality of spine points 42 and 44. Spine points 44 represent spine points from a first image, such as image 20 of FIG. 2. Spine points 42 represent spine points from a second image, such as a pre-processed image, such as image 30 of FIG. 3. The dotted spine points 44 may illustrate a non-adjusted spine area of the bovine animal. The x-pattern spine points 42 may illustrate an adjusted spine area of the bovine animal.

Before performing such process for aligning and/or adjusting a spine area of the bovine animal, the electronic device may perform a transformation of the sensor data (such as second sensor data), such as a camera tilt correction. An electronic device(s) disclosed herein (such as, electronic device 300, 300A of FIG. 1) may perform the camera tilt correction by rotating (such as, align and/or adjust), based on a normal vector of a floor plane (such as, a ground level and/or plane associated with an environment when the bovine animal is in), point cloud coordinates associated with the pre-processed image (such as, pre-processed second sensor data). In other words, the electronic device may rotate the point cloud coordinates so that the normal vector of the floor plane aligns with a z-axis in the point cloud space (such as, a 3D space associated with the pre-processed image). The electronic device may determine the normal vector of the floor plane by determining one or more parameters indicative of a position and tilt of a floor (such as, ground associated with an environment when the bovine animal is in) in relation to a point cloud space associated with the sensor, such as ToF camera.

The electronic device may determine one or more spine points corresponding to the spine area of the bovine animal by determining a highest point associated with each column associated with the pre-processed second sensor data (such as, image 30 of FIG. 3) that contains non-zero values. The electronic device may adjust the one or more spine points by fitting a line based on XY-coordinates of the one or more spine points. The electronic device may adjust the one or more spine points by measuring an angle between the fitted line and an x-axis of the second sensor (such as ToF camera). For example, the fitted line may be adjusted to align with the x-axis of the second sensor based on the measured angle.

In other words, the electronic device may determine one or more spine points corresponding to the spine area of the bovine animal and align the one or more spine points with a horizontal axis (such as, the x-axis of the second camera). For example, the electronic device aligns the one or more spine points to ensure that the bovine animal is aligned with a walking direction (such as, the x-axis of the ToF camera).

Figure 5:
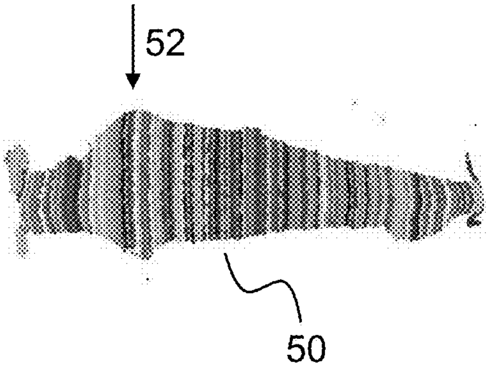
FIG. 5 is an example image representative of three-dimensional sensor data after binning according to this disclosure.

FIG. 5 shows an example image 50 representative of the three-dimensional sensor data associated with a bovine animal after a binning procedure according to this disclosure. The image 50 can be seen as a result of binning a ToF image, such as a pre-processed ToF image.

Image 50 represents for example the bins derived from the three-dimensional sensor data, for example after pre-processing and/or transformations. In FIG. 5, each bin is represented by a stripe, such as bin 52.

The electronic device disclosed (such as, electronic device 300, 300A of FIG. 1) may divide or distribute the sensor data (such as the second sensor data, such as 3D sensor data) into a number of bins associated with a width and a length along an x-axis of the sensor (such as the second sensor). The x-axis is optionally substantially aligned with a spine of the bovine animal. The electronic device disclosed (such as, electronic device 300, 300A of FIG. 1) may divide the one or more spine points into a number of bins, with each bin having a width (for example, 1 cm) and a length along an x-axis in a respective point cloud space.

The electronic device may divide the one or more transformed spine points (such as, one or more rotated and/or adjusted spine points, one or more point cloud coordinates, such as illustrated in FIG. 4 as x-pattern line 42) into the number of bins, with each bin having a width (for example, 1 cm) and a length along an x-axis in a respective point cloud space. The electronic device may determine, for each bin, a highest point on a z-axis in the respective point cloud space. The highest point in each bin may be seen as a spine point in the respective point cloud space. In some examples, the highest point in the bin is a point which is at a percentile (such as 95:th percentile) in height (along z-axis). This for example allows removing points that are there due to noise in the measurement, such as outliers The electronic device may include, for each bin, as part of the one or more spine points, one or more points that have a distance to the spine point (such as, the highest point) smaller than a distance threshold in the z-axis. For example, stated differently, using the calculated bins: in each bin, points that have a distance larger than a distance threshold (such as x cm) in the z-axis from each spine point are excluded. In other words, for example, points with the highest x centimeters in each bin are kept for further processing. In some examples, for each bin, the length is computed using the k:th and (100−k):th percentile in y-direction for all points in the bins.

For example, such procedure generates an area that is thinner around the shoulders of the bovine animal (such as, a thinner shoulder area), since such body part of the bovine animal slopes downwards from the spine area. The area around the hips, such as a hip bone area, may be flat in comparison with the area around the shoulders. Therefore, the hip bone area may be wider than a shoulder area, as illustrated in FIG. 5.

The electronic device may determine, based on the number of bins, a third region of interest, such as a region around a hip bone area of the bovine animal. The third region of interest may comprise one or more hip points corresponding to the hip bone area of the bovine animal (such as to the pelvic bone area). The electronic device may determine the one or more hip points by determining a widest bin 52 amongst the number of bins. The widest bin 52 may be seen as a hip bin, such as a bin associated with the hip bone area of the bovine animal. The electronic device may determine the one or more hip points by determining a certain number of bins that are above and below the widest bin. In other words, the electronic device may determine, as part of the one or more hip points, the points that are associated with a pre-determined number of bins above and below the widest bin. For example, the points that are associated with a pre-determined number of bins above and below the widest bin 52 are associated with the hip bone area. In some examples, the pre-determined number of bins may be selected arbitrarily as long as a substantial part of the back of the bovine animal is covered. For example, a bin width of 1 cm and 20 bins above and 60 bins below can be used to determine hip points, which results in 80 bins in total of the area of the bovine animal. For example, after determining the one or more hip points, an area is cropped out around the hip bone area (see FIG. 6A) and provides a number of bins above and below the widest bin 52, such as in relation to a position of a first and a second hook bone. The present disclosure may allow an accurate identification of a hip bone area in the bovine animal.

The present disclosure provides one or more techniques for identifying a bovine animal based on one or more operations illustrated in FIGS. 2-5.

Figure 6A:
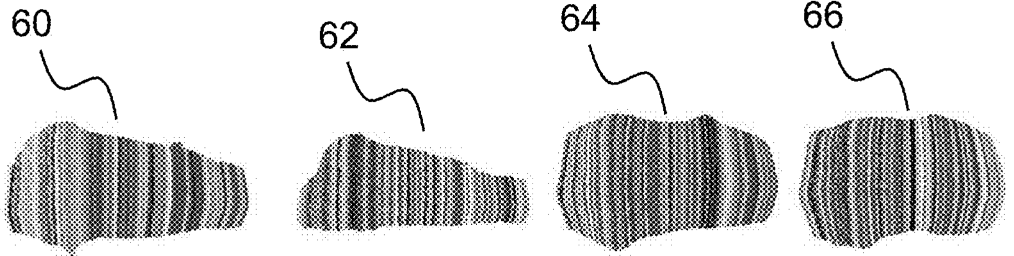
FIG. 6A illustrates example points clouds of a plurality of bovine animals according to this disclosure.

FIG. 6A illustrates example a plurality of points clouds 60, 62, 64, 66 of a bovine animal for one or more height levels according to this disclosure. The one or more height levels may correspond to one or more distance thresholds disclosed herein.

The plurality of points clouds 60, 62, 64, 66 may be seen as one or more third regions of interest. In other words, the plurality of points clouds 60, 62, 64, 66 may be areas generated based on a 3D image of the bovine animal after a binning procedure, such as image 50 of FIG. 5 and optionally after transformation (such as alignment, rotation, adjustment to the spine). For example, the plurality of points clouds 60, 62, 64, 66 refer to a sub-area of the ToF image 50 of FIG. 5.

For example, the plurality of point clouds 60, 62, 64, 66 refer to areas which are generated by discarding one or more points that have a distance to a spine point that is greater than a distance threshold (corresponding a height level). In some examples, the discarding is based on a percentile of the height (such as k:th and (100-*k*):th percentile to discard outliers along a given axis). In other words, the distance threshold may be seen as a percentile of the height applied to discard some points. The plurality of point clouds 60, 62, 64, 66 may be associated with a plurality of distance thresholds or height levels, such as for 50 mm, 30 mm, 100 mm, 150 mm, respectively. For example, an electronic device (such as, electronic device 300, 300A of FIG. 1) may generate the plurality of point clouds 60, 62, 64, 66 by generating a contour map (such as, a topographic map) associated with the bovine animal (see for example FIG. 6C). The contour map may comprise a plurality of contour lines and/or elevation curves. From each spine point, in each bin with a given bin width, the electronic device may generate the point clouds 60, 62, 64, 66, by excluding, from the sensor data, the one or more points having a distance to the spine point that is equal to or greater than a distance threshold (such as equal to or greater than 50 mm, 30 mm, 100 mm, 150 mm, such as for height levels 50 mm, 30 mm, 100 mm, 150 mm). From each spine point, in each bin, the electronic device may generate the point clouds 60, 62, 64, 66, by including the one or more points having a distance to the spine point that is smaller than the distance threshold (such as smaller than 50 mm, 30 mm, 100 mm, 150 mm, such as for height levels 50 mm, 30 mm, 100 mm, 150 mm).

For example, the plurality of point clouds 60, 62, 64, 66 refers to areas which are generated by discarding the points that are associated with a pre-determined number of bins above and below a widest bin (such as, widest bin 52 of FIG. 5) which may be associated with a hip bone area. For example, the electronic device may generate the plurality of point clouds 60, 62, 64, 66 by discarding (such as, cropping out) a number of bins above and below the hip bone area.

The electronic device may generate the plurality of point clouds 60, 62, 64, 66 by discarding not only one or more points based on the plurality of height levels but also a number of bins positioned above and below the hip bone area (such as, a widest bin).

Figure 6B:
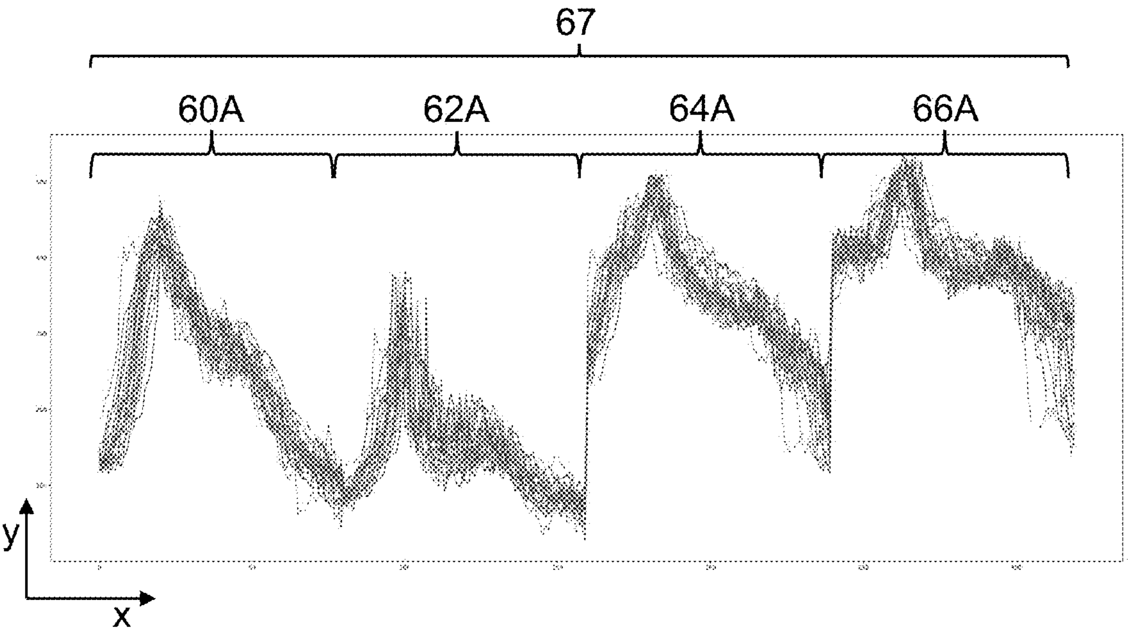
FIG. 6B illustrates example feature vectors of a bovine animal according to this disclosure.

FIG. 6B illustrates example feature vectors 67, 60A, 62A, 64A, 66A of a bovine animal according to this disclosure. FIG. 6B illustrates the feature vectors 60A, 62A, 64A, 66A associated with a plurality of points clouds (such as, plurality of point clouds 60, 62, 64, 66 of FIG. 6A) of the bovine animal (such as, of the same bovine animal). The feature vectors 60A, 62A, 64A, 66A may be concatenated into one feature vector 67. The x-axis illustrates an index associated with a number of bins. The y-axis illustrates a width associated with each bin in centimetres. The feature vectors are in some examples second feature vectors. Each feature vector 60A, 62A, 64A, 66A represents the width in the corresponding height level on the bovine animal back seen in FIG. 6A.

For example, an electronic device (such as, electronic device 300, 300A of FIG. 1) generates a feature vector (such as second feature vector) for each height level by determining a length of a bin for each spine point. Each feature vector 60A, 62A, 64A, 66A is associated with a corresponding height level, such as height levels such 92A, 92B, 94A, 94B, 96A, 96B, 98A, 98B of FIG. 6C. In other words, the length of each bin may be determined by each distance threshold (such as, each height level) from each spine point. Feature vectors 60A, 62A, 66A, 66A may illustrate a width associated with height levels of 50 mm, 30 mm, 100 mm, 150 mm, respectively. A feature vector may be seen as the shape of elevation of the bovine animal, such as a body shape of the bovine animal viewed and/or recorded by a sensor from above.

Feature vectors 60A, 62A, 66A, 66A may be updated as time progresses, as the bovine animal may change in morphologic appearance over time. Feature vector 67 may be updated accordingly. Ground truth may be collected by an existing Radio Frequency Identification, RFID, reader in connection to a camera, such as, a ToF camera. The present disclosure may allow permanent and/or ad hoc update of ground truth data associated with an animal in an environment. In other words, the present disclosure may provide for an update of topological and/or morphological features of an animal (such as, body shape, contour of an animal) over time.

Figure 6C:
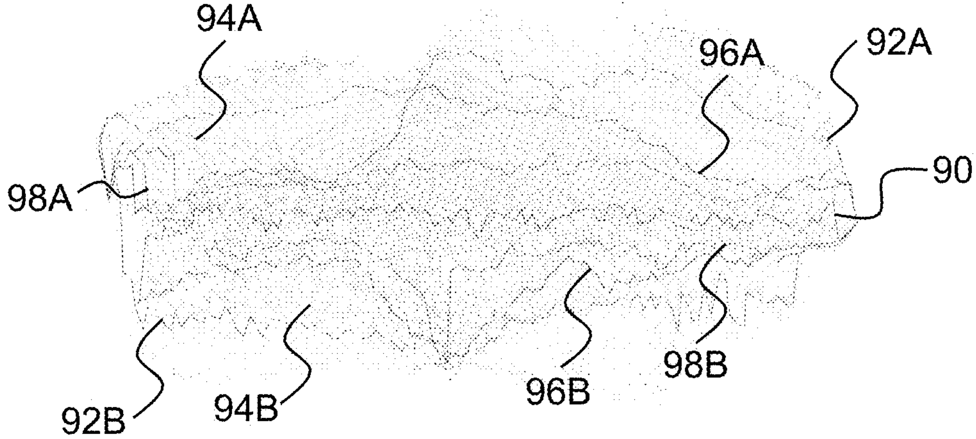
FIG. 6C illustrates example contour levels associated with a bovine animal according to this disclosure.

FIG. 6C illustrates example contour levels associated with a bovine animal according to this disclosure. FIG. 6C shows a contour map (such as, a topographic map) associated with the bovine animal. A contour map may comprise a plurality of contour lines and/or elevation curves, such as represented by a plurality of dots in FIG. 6C. The plurality of contour lines and/or elevation curves may provide information about a shape of the bovine animal. FIG. 6C may illustrate a topographic map including a spine area and a hip bone area of a bovine animal.

FIG. 6C shows curves 92A, 92B, 94A, 94B, 96A, 96B, 98A, 98B representative of height levels for the generation of a plurality of point clouds (such as, plurality of point clouds 60, 62, 64, 66 of FIG. 6A). For example, curve 90 is associated with one or more spine points corresponding to a spine area of the bovine animal. For example, the height level 98A, 98B is associated to a height level of 30 mm. For example, the height level 96A, 96B is associated to a height level of 50 mm. For example, the height level 98A, 98B is associated to a height level of 100 mm. An electronic device (such as, electronic device 300, 300A of FIG. 1) may generate the plurality of point clouds (such as, plurality of point clouds 60, 62, 64, 66 of FIG. 6A) by discarding one or more points that have a distance to a spine point that is greater than a distance threshold, such as a height level. In other words, the electronic device may discard one or more points positioned outside curves 98A, 98B when the height level is of 30 mm. The same reasoning may be applied to height levels 96A, 96B, 94A, 94B, 92A, 92B.

The present disclosure provides one or more techniques for determining a lameness parameter of a bovine animal based on operations illustrated in FIGS. 2-5.

Figure 7A:
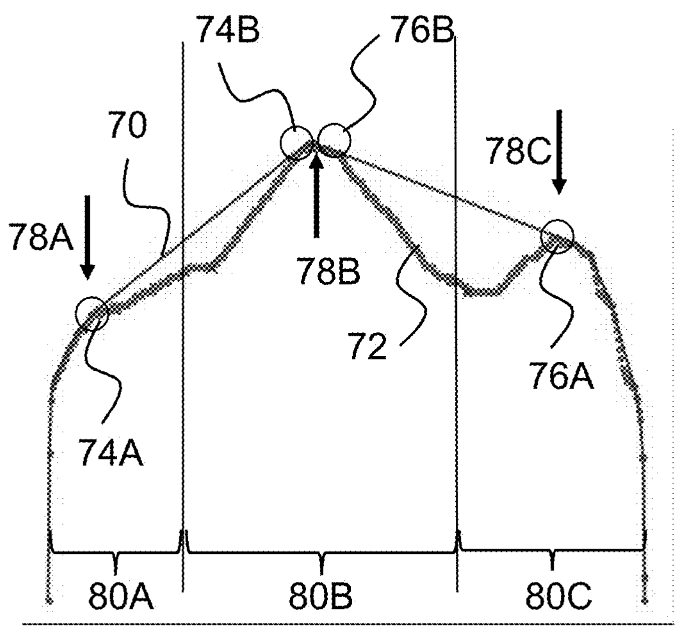
FIG. 7A illustrates an example cross section of a hip area of a bovine animal according to this disclosure.

FIG. 7A illustrates an example cross section 72 of a hip bone area of a bovine animal according to this disclosure. The cross section 72 may be seen as a shape associated with the hip bone area (such as, a widest bin) as a result from a view of the hip bone area when cut by a plane, such as a vertical plane.

Three humps may be discernible from the cross section 72. The three humps may correspond to the first hook bone 78A, the sacrum area 78B, and the second hook bone 78C (such as anatomical points). An electronic device (such as, electronic device 300, 300A of FIG. 1) may be configured to determine one or more of the sacrum area 78B, the first hook bone 78A, and the second hook bone 78C of the bovine animal using the cross section 72 of the hip bone area of a bovine animal. The cross section 72 of the hip bone area may correspond to a hip bone area (such as, comprising one or more hip points) of the bovine animal of FIG. 6A for a height level. The cross section 72 of the hip bone area may correspond to a hip bone area of the bovine animal 60 of FIG. 6A, in which the bovine animal 60 may be generated by the electronic device for a height level (such as, a distance threshold to a spine point) of 50 mm.

The electronic device may determine the sacrum area 78B by dividing a widest bin (such as, widest bin 52 of FIG. 5) into a first part 80A, a second part 80B, and a third part 80C along a y-axis. The electronic device may determine, based on the second part 80B, a highest hip point. The highest hip point may be located in the second part 80B. The highest hip point (and/or another point in close proximity to the highest hip point) may be seen as the sacrum area 78B of the bovine animal.

The electronic device may determine the first hook bone 78A and the second hook bone 78C by determining a convex hull 70 associated with the cross section 72 (such as, the one or more hip points). In one or more examples, a convex hull can be seen as a subset of points that form the smallest convex set of points possible. For example, for a set of points to be convex, any line segment drawing between two points in the set of points is contained with the same set of points, and has no indentations. For example, the convex hull 70 of the one or more hip points can be seen as the smallest convex polygon which comprises all the one or more hip points. The electronic device may determine the first hook bone 78A by determining, based on the convex hull 70, a first pair of hip points (such as, neighbouring points). The first pair of hip points may comprise a first hip point 74A corresponding to a first hook bone of the bovine animal and a third primary hip point 74B proximal to the highest hip point. For example, the hip points 74A, 74B of the first pair can have a considerable distance between each other, such as a distance between a third primary hip point 74B proximal to the sacrum area 78B and the first hook bone 78A. The electronic device may determine the second hook bone 78C by determining, based on the convex hull 70, a second pair of hip points (such as, neighbouring points). The second pair of hip points may comprise a second hip point 76A corresponding to a first hook bone of the bovine animal and a third secondary hip point 78BB proximal to the highest hip point. For example, the hip points 76A, 76B of the second pair can have a considerable distance between each other, such as a distance between a third secondary hip point 76B proximal to the sacrum area 78B and the second hook bone 78C.

The present disclosure provides a more accurate identification of anatomical points associated with a hip bone area of a bovine animal. The present disclosure may benefit from such accurate identification of anatomical points associated with a hip bone area of a bovine animal to identify a movement, such as gait pattern for detecting a dysfunction, such as a lameness condition, related to the bovine animal. The appearance of the hook bones (such as, the first and second hook bones) may be affected by position of hind legs of the bovine animal, thus conveying beneficial information about the position of the hind legs.

Figure 7B:
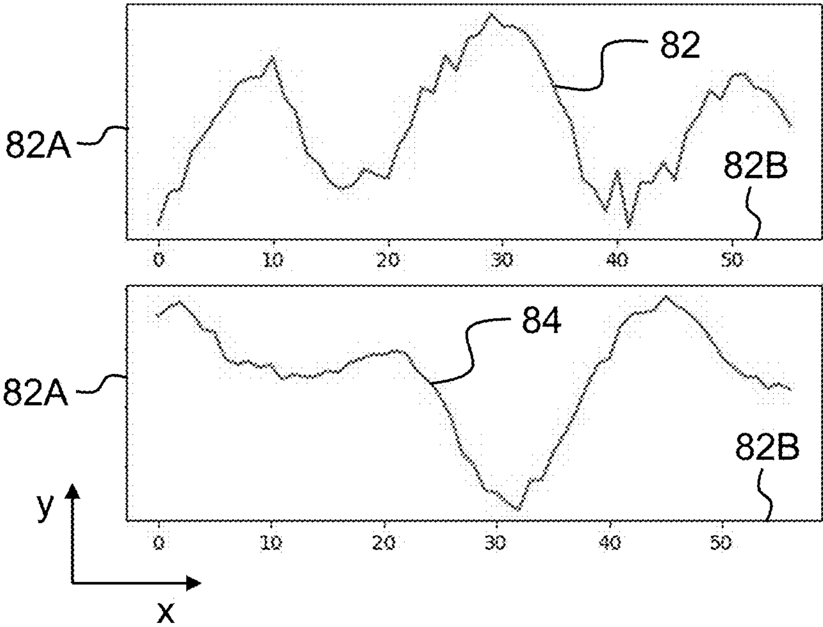
FIG. 7B illustrates example gait patterns associated with a bovine animal according to this disclosure.

FIG. 7B illustrates example gait patterns 82, 84 associated with a bovine animal according to this disclosure. FIG. 7B shows the gait patterns 82, 84 (such as, in a y-axis) in function of a number of frames 82B (such as, in an x-axis). A gait pattern may be seen as an amplitude 82A associated with a range of movement of the bovine animal over time. The number of frames 82B may be sampled at a rate of 30 Hz (such as, frames per second). A frame may correspond to a walking time associated with the bovine animal for a given time period. The time period can vary depending on the size of the field of view. The gait patterns 82, 84 may be given millimetres, mm.

A gait pattern may be seen as a sacrum gait curve. In other words, a gait pattern may describe a movement of a sacrum area of a bovine animal over a number of frames (such as, over time). Put differently, a gait pattern may show how a position of the sacrum area of a bovine animal varies over a number of frames, such as in one or more gait (such as, walking) cycles.

The gait pattern 82 may be associated with a healthy bovine animal. The gait pattern 82 associated with one or more positions of the sacrum area of a bovine animal forms a sinusoidal-like curve over time. The gait pattern 82 may be seen as a normal gait pattern. The gait pattern 82 may show that a normal gait pattern may have an amplitude (such as, the height difference between adjacent valley and peak, such as a peak-to-peak amplitude) of about 35 mm on average. Further, a normal gait pattern may show a periodicity and/or substantial symmetry. In other words, symmetry may be seen between two adjacent periods and may show the similarity in amplitude between neighboring peaks.

The gait pattern 84 may be associated with a lame bovine animal, such as an animal suffering from a lameness condition, such as showing signs of an abnormal gait and/or stance (such as, hip drop and/or hip hike). The gait pattern 84 may be seen as an abnormal gait pattern. The gait pattern 84 may be considerably higher for limping bovine animals (such as, lame bovine animals). Further, the gait pattern 84 may have a propensity towards pattern unevenness. The gait pattern 84 may show substantial asymmetry.

An amplitude and a pattern may be seen as distinct features for distinguishing a lame bovine animal from a healthy bovine animal.

Figure 8A:
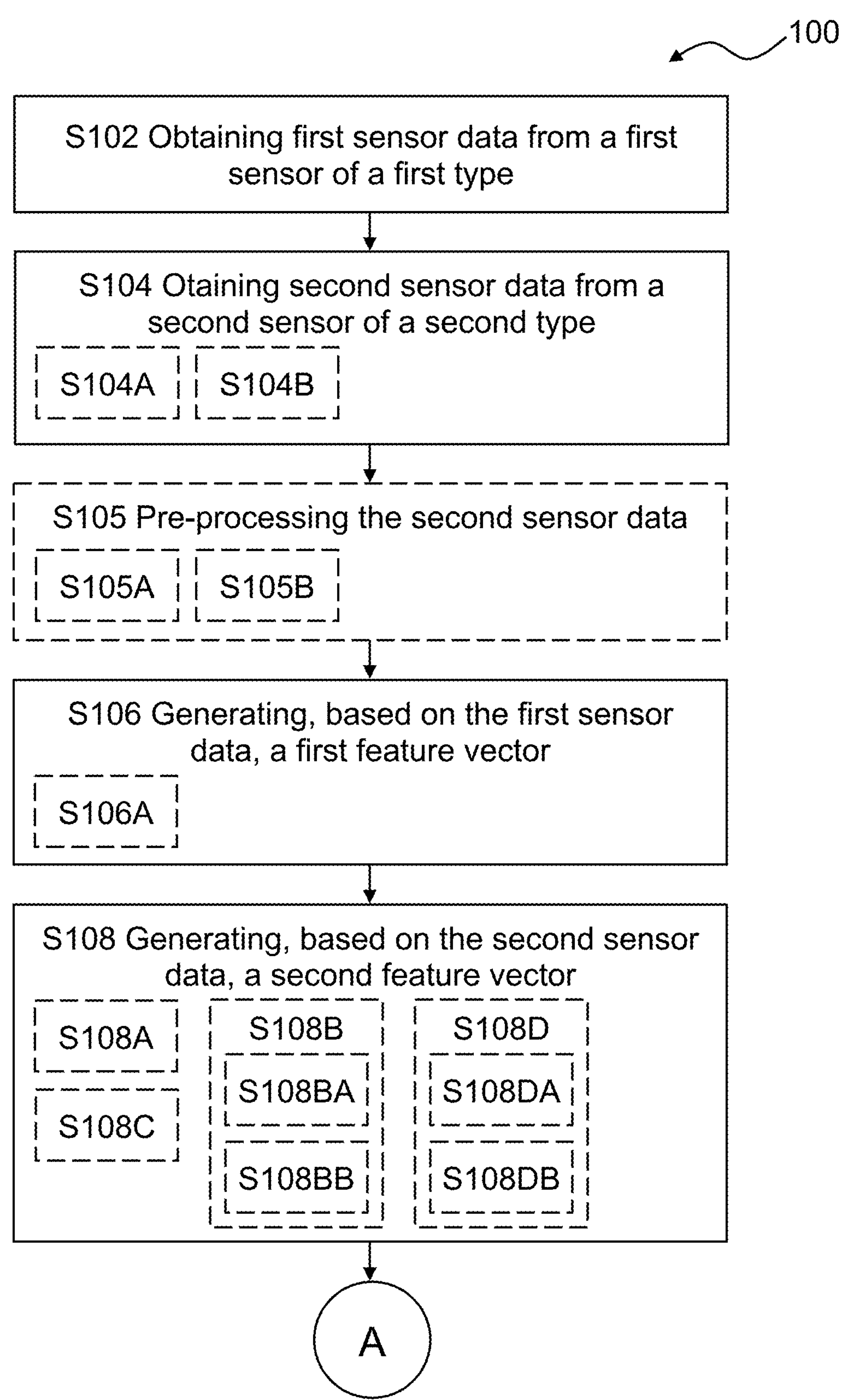
FIGS. 8A-8B show a flow-chart illustrating an example method, performed in a wireless device, for identifying a bovine animal in an environment according to this disclosure.
Figure 8B:
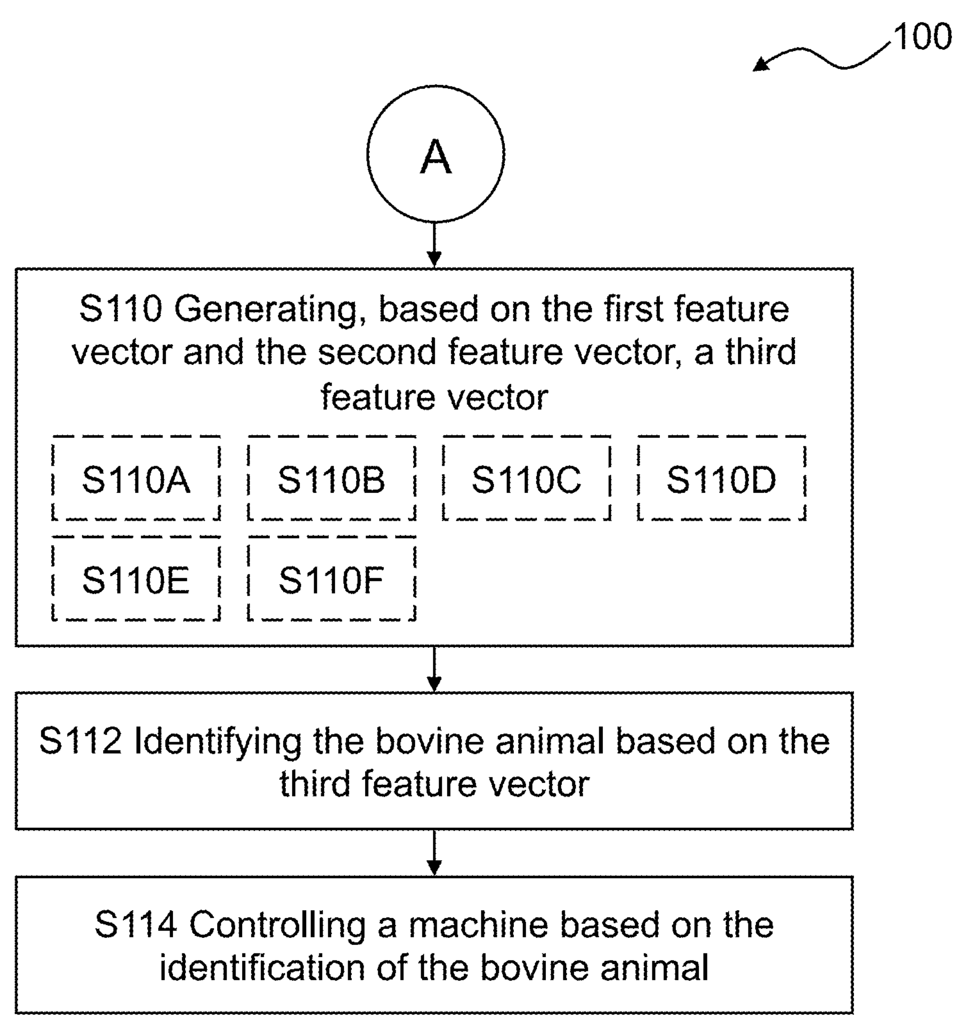

FIGS. 8A-8B show a flow-chart of an example method 100, performed by an electronic device according to the disclosure, for identifying an animal, such as a bovine animal, in an environment. The electronic device is the electronic device disclosed herein, such as electronic device 300, 300A of FIG. 1 and 500 of FIG. 9.

The electronic device performing method 100 may be seen as an animal monitoring device and/or an animal identifying device and/or a device configured to identify a bovine animal.

The method 100 may be applied to an animal, such as one or more of: walking mammals, livestock animals, and farming animals. The method 100 may be applied to one or more of: a bovine animal (e.g., cattle), a swine animal, an equine animal, and any other suitable animal breed. In other words, The method 100 may be applied to one or more of: a cow, a calf, a horse, a goat, a pig, and a sheep.

The method 100 comprises obtaining S102 first sensor data from a first sensor of a first type. In one or more examples, the first sensor can be seen as a first camera. The first sensor data comprises two-dimensional, 2D, image data representative of the bovine animal in the environment.

The method 100 comprises obtaining S104 second sensor data from a second sensor of a second type. In one or more examples, the second sensor can be seen as a second camera. The second type is different from the first type. The second sensor data is indicative of one or more distances associated with the environment. FIG. 2 shows an example representation of the second sensor data.

The method 100 comprises generating S106, based on the first sensor data, a first feature vector. The first feature vector may be indicative of a classification of the first sensor data into one or more classes representative of a given bovine animal (such as a specific bovine animal, such as previously identified bovine animal.) The first feature vector can be a RGB or monochrome feature vector.

The method 100 comprises generating S108, based on the second sensor data, a second feature vector. The second feature vector may be indicative of one or more spatial features of a part of the bovine animal, such as of a shape of a part of the bovine animal. The second feature vector can be seen as a 3D feature vector, such as a ToF feature vector.

The method 100 comprises generating S110, based on the first feature vector and the second feature vector, a third feature vector. The third feature vector can be seen as a feature vector characterizing a range of information including 3D information and colour information.

The method 100 comprises identifying S112 the bovine animal based on the third feature vector. For example, in S112, an identifier (such as a unique identifier) may be generated and assigned to the bovine animal.

In one or more example methods, the first sensor of the first type is a two-dimensional camera. In some examples, the first sensor is configured to provide a matrix with pattern information indicative of the environment and the bovine animal. In some examples, the matrix may include RGB information and/or monochromatic information. In one or more example, the first sensor of the first type can be one or more of: a Charged-Coupled Device, CCD, camera, a Complementary Metal-Oxide Semiconductor, CMOS, camera, a Digital Single Lens Reflex, DSLR, a smartphone camera, and any other suitable 2D camera. In one or more example methods, the first sensor has the same and/or an approximate field of view (such as, a same range) as the second sensor. Put differently, the first sensor may be located in a same or next to location of the second sensor. For example, the first camera has the same field of view as the second camera.

In one or more example methods, the first sensor of the first type is a Red Green Blue, RGB, camera and/or an RGB-InfraRed, IR, camera and/or a monochrome camera. In one or more examples, a monochrome camera captures an intensity of light. The monochrome camera may generate greyscale images of the bovine animal in the environment. In one or more examples, an RGB camera captures light in red, green, and blue wavelengths (such as, visible light) for generating coloured images of the bovine animal in the environment. In one or more examples, an RGB-IR camera captures IR light in addition to the visible light for generating brighter coloured images of the bovine animal in the environment. In one or more examples, the first sensor data may comprise a coloured image of the bovine animal in the environment. The first feature vector may be seen as a RGB and/or RGB-IR and/or monochrome feature vector. In some examples, the first sensor is connected (such as operatively connected) to the second sensor.

In one or more example methods, the second sensor of the second type is a three-dimensional, 3D, camera. In one or more examples, the second sensor of the second type can be one or more of: a structured light 3D camera, a Time-of-flight, ToF, camera, a 3D camera, a stereo 3D camera, a Light Detection and Ranging, LiDAR, camera, a 3D scanning system, and any other suitable 3D camera.

In one or more example methods, the second sensor of the second type is a Time of Flight, ToF, camera. In one or more examples, the second sensor measures depth and distance. The second sensor may be seen as a range imaging sensor. In one or more examples, the second sensor measures, based on ToF, one or more distances between the second sensor and each element of the environment including the bovine animal. The second feature vector may be seen as a ToF feature vector.

In one or more example methods, the second sensor data comprises one or more three-dimensional, 3D, coordinates associated with each element of the environment and the bovine animal, and/or one or more point clouds. In one or more examples, the second sensor measures a 3D coordinate (such as, a 3D position) of each element in the environment and the bovine animal by evaluating the time delay from when a light signal is emitted and when the reflected light signal is received by the second sensor. The one or more 3D coordinates may be seen as the one or more points clouds. In one or more examples, the second sensor may allow measuring a size of each element comprised in the environment which includes the bovine animal. In one or more examples, the second sensor data comprises a 3D representation (such as, 3D shape) of the bovine animal in the environment. The environment can include other objects than the bovine animal, like props and walls.

In one or more example methods, the method 100 comprises pre-processing S105 the second sensor data. In one or more example methods, pre-processing S105 the second sensor data comprises removing S105A, from the second sensor data, one or more of: background data associated with a background in the environment, and body part data associated with parts of the body of the bovine animal. In one or more examples, removing the background data associated with a background in the environment comprises performing background subtraction on the second sensor data for provision of the second sensor data (such as, an image) solely comprising the bovine animal. The background in the environment may comprise the surroundings of the bovine animal, such as one or more of: fences, dirt, milk machinery, feeders, and any other suitable element of the environment. This is in part illustrated in FIG. 3 compared to FIG. 2.

The electronic device may extract the bovine animal from the second sensor data based on one or more of: a second primary sensor data and a second secondary sensor data. The second primary sensor data may be seen as a background reference 3D image. The background reference 3D image is an image of the environment without the bovine animal present. In other words, the background reference 3D image may solely include the background environment. The second primary sensor data may be seen as a complete 3D image (such as, the image 20 of FIG. 2). The complete 3D image may comprise the bovine animal and the background environment. In one or more examples, removing the background data associated with a background in the environment comprises comparing the second primary sensor data and the second secondary sensor data for provision of the second sensor data (such as, an image) solely comprising the bovine animal.

The background reference image may be updated regularly as the second sensor may move slightly over time and/or due to changes occurring in the environment where the bovine animal is in. Put differently, the method may comprise storing the background reference image whenever there is a change in the environment surrounding the bovine animal and/or in a field of view (such as, range) of the second sensor.

Any remaining parts not removed in the background subtraction may be of a small size. The method may comprise removing such remaining elements (such as, element which may not belong the bovine animal) by applying thresholding techniques to the second sensor data after a first pre-processing stage (such as, the background subtraction).

In one or more examples, the body part data associated with parts of the body of the bovine animal is removed upon acquiring a plurality of frames (such as, a plurality of images) of the bovine animal in 3D. In one or more example methods, the parts of the body to be removed include a head, a neck area, a shoulder area, a part of a back area, and/or a tail of the bovine animal. In one or more examples, removing the body part data associated with parts of the body of the bovine animal may comprise aligning a spine of the bovine animal to an x-axis for provision of a normal vector of a floor plane. In one or more examples, the parts of the body are removed after aligning the spine of the bovine animal to an x-axis. For example, the parts of the body may be cropped off by removing one or more data columns associated with the second sensor data whose sum is below a first threshold. As illustrated by image 30 of FIG. 3, the head and/or a part of the back area may be cropped off by removing the one or more data columns associated with the second sensor data whose sum is below the first threshold. For example, the body of the bovine animal may be cropped by the shoulder area and/or neck area when the neck area is thin, as illustrated by image 30 of FIG. 3.

In one or more example methods, pre-processing S105 the second sensor data comprises transforming S105B the second sensor data. In one or more examples, transforming the second sensor data comprises a camera tilt correction, such as a second sensor tilt correction. In one or more examples, transforming the second sensor data comprises determining a normal vector of a floor plane. In one or more examples, determining the normal vector of a floor plane comprises determining one or more parameters representative of position and tilt of the floor (such as in relation to the second sensor (such as, the ToF camera). The present disclosure may allow a normalised view of a bovine animal (and/or of a plurality of bovine animals) in the 3D space (e.g., a point cloud space) associated with the second sensor.

In one or more examples, transforming the second sensor data comprises rotating the one or more 3D coordinates (such as, point cloud coordinates) based on the normal vector of the floor plane. Stated differently, transforming the second sensor data comprises aligning the normal vector of the floor plane with a z-axis in a 3D space associated the second sensor data.

In one or more examples, determining the second feature vector comprises performing a camera tilt correction, such as a second sensor tilt correction, from each spine point, in each bin, and for each height level. This may be similar to S105B. The feature vector may be generated by determining the length of each bin for each height level.

A feature vector may be associated with a plurality of height levels. In other words, a feature vector (such as, feature vector 67 of FIG. 6B) may be seen as a concatenation of feature vector associated with each height level (such as, feature vectors 60A, 62A, 64A, 66A of FIG. 6B). This may be illustrated in FIG. 6B. A feature vector may be associated with a single height level.

In one or more example methods, generating S106, based on the first sensor data, the first feature vector comprises applying S106A a deep learning technique to the first sensor data. In one or more examples, the deep learning technique comprises a contrastive loss function. A contrastive loss function may be used for image classification and/or object detection. In one or more examples, a contrastive loss function determines (such as, learn) representations of input data (such as, the first sensor data) which are more discriminative (such as, distinguishable). In other words, a contrastive loss function may associate one or more images to either a same class or a different class. In one or more examples, applying a contrastive loss function the input data comprises determining a distance metric parameter between the one or more images. For example, the distance metric parameter is indicative of a distance between the one or more images. The distance between the one or more images may be smaller when the one or more images belong to a same class. A class may be associated with a specific bovine animal.

In one or more example methods, generating S108, based on the second sensor data, the second feature vector comprises dividing S108A the second sensor data into a number of bins associated with a width and a length along an x-axis of the second sensor. In other words, generating the second feature vector comprises binning one or more point coordinates associated with the bovine animal. The number of bins may be illustrated in FIGS. 5-6A (see, for example, the vertical stripes in the bovine animal). In one or more example methods, the x-axis is substantially aligned with a spine of the bovine animal. Stated differently, the x-axis may be parallel to the spine of the bovine animal.

In one or more example methods, generating S108, based on the second sensor data, the second feature vector comprises determining S108B, based on the second sensor data, one or more spine points corresponding to a spine area of the bovine animal. In one or more examples, the one or more spine points are determined by determining a highest point associated with each image column that contains non-zero values. In one or more examples, determining the one or more spine points comprises adjusting the one or more spine points. For example, adjusting the one or more spine points comprises fitting a line based on coordinates (such as, X and Y coordinates) of the one or more spine points. For example, adjusting the one or more spine points comprises measuring an angle between the fitted line and an x-axis of the second sensor. For example, the fitted line may be adjusted to align with the x-axis of the second sensor based on the measured angle. In one or more examples, the adjusted one or more spine points associated with the pre-processed second sensor data may be divided into one or more bins, each of the one or more bins with a width and a length, along the x-axis in respective point coordinate space (such as, the 3D space associated the second sensor data). In one or more examples, dividing S108A the second sensor data into the number of bins is performed after determining and/or aligning the one or more spine points corresponding to the spine area of the bovine animal.

In one or more example methods, determining S108B the one or more spine points corresponding to a spine area of the bovine animal comprises determining S108BA, for each bin, as a spine point of the one or more spine points, a highest point on a z-axis of the second sensor. In other words, in each bin, the highest point on the z-axis may be assigned as a spine point of the one or more spine points.

In one or more example methods, determining S108B the one or more spine points corresponding to a spine area of the bovine animal comprises including S108BB, for each bin, for each spine point, as part of the one or more spine points, one or more points that have a distance to/from the spine point that is smaller than or equal to a distance threshold.

In one or more examples, generating the second feature vector comprises generating a contour map (such as, a topographic map) associated with the pre-processed second sensor data (such as, a pre-processed image of the bovine animal) as illustrated in FIG. 6A and FIG. 6C. The contour map may comprise a plurality of contour lines and/or elevation curves. In one or more examples, determining the one or more spine points corresponding to a spine area of the bovine animal may comprise excluding, for each bin, one or more points that have a distance larger than the distance threshold to each spine point in the z-axis. For example, excluding the one or more points that have a distance larger than the distance threshold to each spine point in the z-axis comprises excluding such one or more points based on the contour map. This may enable generation a first area that may be thinner around the shoulders of the bovine animal, since that part of the bovine animal may slope downwards from the spine area. This may enable generation of a second area that may be wider around the hips since the second area may be flat when compared to the first area. This may be illustrated in FIG. 5. In one or more examples, including the one or more points that have a distance to the spine point that is smaller than or equal to a distance threshold may enable determination of a region of interest around a hip bone area of the bovine animal. In some examples, a k:th percentile and (100−k):th percentile can be used to discard anomalous points on the edges (y-axis) of the bins.

In one or more example methods, generating S108, based on the second sensor data, the second feature vector comprises determining S108C, for each spine point, the second feature vector for each height level based on a length of a bin for each spine point. In one or more example methods, the length of each bin is determined by each distance threshold from each spine point. In one or more example methods, each height level (such as, height levels 50 mm, 30 mm, 100 mm, 150 mm of FIG. 5, 6A, 6B) corresponds to a respective distance threshold. In one or more examples, generating the second feature vector comprises determining one or more parts of the second feature vector. For example, each part of the second feature vector may be determined based on the lengths of the bins.

In one or more example methods, generating S108, based on the second sensor data, the second feature vector comprises determining S108D, based on the second sensor data, one or more hip points corresponding to a hip bone area of the bovine animal. In one or more example methods, the second feature vector includes the one or more hip points. In one or more examples, determining the one or more hip points comprises removing one or more points clouds that are located around the hip bone area of the bovine animal.

In one or more example methods, determining S108D the one or more hip points comprises determining S108DA the widest bin amongst the number of bins.

In one or more example methods, determining S108D the one or more hip points comprises determining S108DB, as part of the one or more hip points, the points that are associated with a pre-determined number of bins above and below the widest bin. In one or more examples, the widest bin may be seen as an origin point coordinate from where the one or more points clouds located around the hip bone area of the bovine animal are selected to be removed. In other words, the widest bin may be seen as an origin point coordinate from where an area of interest (such as, an area comprising the one or more hip points) is decided from. In some examples, the widest bin is the widest bin in a given height level (such as 50 mm) and/or in a given direction (such as direction of y-axis). For example, the pre-determined number of bins above and below the widest bin can be representative of a position of the hook bones of the bovine animal. The pre-determined number of bins above and below the widest bin may be selected based on a type of animal. The number of bins above and below the widest bin may be arbitrarily pre-selected. FIG. 6A illustrates one or more regions of Interest around the hip bone area of the bovine animal which can be extracted based on the pre-processed second sensor data (such as, image 50 of the bovine animal of FIG. 5).

In one or more examples, cropping out an area around the hip bone area of the bovine animal based the pre-determined number of bins above and below the widest bin allows robustness so that the generation of the second feature vector (such as, the generation of each feature vector related to each height level) is performed using a same position as a point of origin (such as, a reference point).

The second feature vector associated with the bovine animal may be updated as time progresses, as the bovine animal may change in morphological appearance over time. Ground truth data (such as, reference data) may be collected using an existing RFID reader in connection to the second sensor.

In one or more example methods, obtaining S104 the second sensor data comprises determining S104A whether the second sensor data meets a criterion. In one or more example methods, obtaining S104 the second sensor data comprises, upon the second sensor data meeting the criterion, storing S104B the second sensor data. In one or more example methods, obtaining S104 the second sensor data comprises, upon the second sensor data not meeting the criterion, forgoing the storing of the second sensor data, and optionally the generation of the second feature vector.

In one or more examples, the present disclosure may allow a more accurate and automatic recording of the sensor data, and of the identification of an event, such as an action in the environment. The second sensor may be configured to store second sensor data (e.g., one or more images) as a response to such event. The second sensor may be configured to start storing the second sensor data when an animal, such as a bovine animal, enters the field of view of the second sensor. In other words, the second sensor data meets the criterion when the second sensor data indicates that an animal, such as a bovine animal, enters the field of view of the second sensor.

For example, the sum of pixel intensity values associated with the second sensor data (such as, an image) decreases when a large object, such as an animal, is included in the same second sensor data. For example, the pixel intensity values may be seen as a representation of a distance between a sensor (such as, a camera) and one or more elements of an environment. For example, when a large object enters the environment, the pixel intensity values associated with respective background (such as, pixel intensity values associated with pixels surrounding the large object) may decrease owing to, for example, a proximity between the sensor and the large object. An electronic device may be configured to start storing the sensor data based on such change in the pixel intensity values.

In one or more examples, obtaining the second sensor data may comprise determining a pixel intensity difference parameter by comparing a sum of pixel intensity values of the second sensor data not including the animal with a sum of pixel intensity values of the sensor data including the animal for provision of. The pixel intensity difference parameter may be indicative of a degree of change in the pixel intensity values of the second sensor data including the animal in relation to the pixel intensity values of the second sensor data not including the animal.

In one or more examples, the second sensor data meets the criterion when the pixel intensity difference parameter exceeds a threshold. In other words, the electronic device may start storing the second sensor data when the pixel intensity difference parameter is greater than or equal to the threshold. The electronic device may stop storing when the pixel intensity difference parameter is less than the threshold. Optionally, the electronic device stops storing the second sensor data when a sufficient number of frames have been stored. Stated differently, the electronic device may stop storing the second sensor data when the number of stored frames exceeds a frame threshold.

In one or more examples, the electronic device may activate or trigger detection (such as, sensing) of the bovine animal in the second sensor data, such as an image, to obtain a certain maximum number of frames of the bovine animal in the environment necessary for identification. The maximum number of frames may be different for S203 and S204 of FIGS. 10A-10B.

In one or more examples, template matching can be used as a triggering event for recording the sensor data.

In one or more example methods, generating S110 the third feature vector comprises combining S110A the first sensor data with the second sensor data using a feature reduction technique (such as, a dimensionality reduction technique). In one or more example methods, the feature reduction technique comprises an artificial neural network, ANN, and/or a linear discriminant analysis, LDA. In one or more examples, a LDA is a supervised learning technique for dimensionality reduction and/or image classification and/or pattern recognition. In one or more examples, a LDA determines a linear combination of features which characterises or separates different classes. In other words, a LDA may determine one or more linear discriminants (such as, directions) in a feature space that have a maximum separation between a plurality of classes. The input data (such as, the first and second feature vector) may be projected onto such linear discriminants. A classifier, such as a linear classifier and/or a quadratic classifier, may be trained to categorise and/or differentiate the plurality of classes based on the projected data.

In one or more examples, the third feature vector is the output of the feature reduction technique for categorising and/or differentiate features associated with the first sensor data and the second sensor data. In one or more examples, the input to the feature reduction technique may be the first feature vector and the second feature vector. In one or more examples, the third feature vector may be based on RGB-based features (and/or monochrome features and/or RGB-IR features) and ToF-based features. In other words, the third vector may be seen as a combination of the ToF-based features and one or more of: the RGB-based features, the monochrome features, and RGB-IR features. The present disclosure may allow improved identification of a bovine animal based on the 3D shape and the colour components of the bovine animal.

New bovine animals may be added to an existing group of bovine animals (such as, herd and/or cattle). A new bovine animal may be seen as a bovine animal that does not already exist (not been previously identified) in an animal monitoring system. Stated differently, the new bovine animal may be unknown from the perspective of the disclosed system. The method 100 may comprise performing a detection and/or identification procedure of a bovine animal unknown to the animal monitoring system. In other words, the method 100 may comprise detecting, based on the third feature vector, whether a bovine animal is known to the animal monitoring system.

A bovine animal (such as, a bovine animal known to the animal monitoring system) may change in morphologic appearance (such as, body shape) over time. It may be envisioned that new reference data (such as, ground truth data and/or images) in conjunction with electronic identification, EID, tag (such as, a reader) are to be collected by the animal monitoring system (such as, an electronic device) at a minimum interval.

In one or more example methods, generating S110 the third feature vector comprises determining S110B a confidence score associated with the third feature vector. In one or more example methods, the confidence score indicates how much the third feature vector matches a previously generated third feature vector associated with an already identified bovine animal. In one or more examples, the method 100 comprises comparing the first and/or second sensor data associated with the third feature vector with the first and/or second sensor data associated with a previously generated third feature vector associated with an already identified bovine animal. In one or more examples, the method 100 comprises comparing the third feature vector with a previously generated third feature vector associated with an already identified bovine animal. In one or more examples, the method 100 comprises determining the confidence score based on the comparison. The confidence score (such as, a level) may be seen as a probability quantifying a likelihood that a detected bovine animal matching with one or more previously detected bovine animals. In other words, the confidence score (such as, a level) may indicate the confidence of a detected bovine animal matching with one or more previously detected bovine animals (such as how close the third vector of detected bovine animal is to the third vector of a previously detected bovine animal). The confidence score may be percentage (such as, a confidence score of 0-100%). The confidence level may indicate how much the first and/or second sensor data (such as, a captured image) associated with the third feature vector matches the reference data associated with a previously generated third feature vector of an already identified bovine animal (such as, previously stored first and/or second sensor data).

In one or more example methods, generating S110 the third feature vector comprises determining S110C whether the confidence score meets a first criterion. In one or more example methods, generating S110 the third feature vector comprises, upon determining that the confidence score meets the first criterion, identifying S110D the bovine animal as the already identified bovine animal. In one or more examples, the confidence score meets the first criterion when the confidence level is greater than or equal to a confidence threshold (such as a threshold used for confidence levels).

In one or more example methods, generating S110 the third feature vector comprises storing S110E the first sensor data and the second sensor data for further identification. In one or more example, the method 100 comprises updating the reference data (such as, one or more of: previously stored first sensor data, previously stored second sensor data, and a respective previously generated third feature vector associated with an already identified bovine animal) with the first and/or second sensor data (such as, a presently captured image) associated with the third feature vector (such as, the current generated third feature vector).

In one or more example methods, generating S110 of the third feature vector comprises, upon determining that the confidence score meets the first criterion, identifying S110F the bovine animal as a new bovine animal. In one or more examples, the confidence score does not meet the first criterion when the confidence level is less than the confidence threshold. The new bovine animal may be seen as a bovine animal that is new (such as, unknown) to the animal monitoring system. In one or more examples, identifying the bovine animal as a new bovine animal comprises assigning a new identifier to the new bovine animal. The new identifier may be a temporary identifier and/or a permanent identifier. For example, identifying the bovine animal as a new bovine animal comprises assigning the temporary identifier to the new bovine animal. The animal monitoring system may use such temporary identifier for collecting and/or reporting procedures. For example, identifying the bovine animal as a new bovine animal comprises updating (such as, at a later stage) the temporary identifier with a permanent identifier (such as, a manual and/or electronic identifier).

In one or more example methods, the method 100 comprises controlling S114 a machine based on the identification of the bovine animal. In one or more examples, controlling a machine based on the identification of the bovine animal may comprise controlling, based on the identification, one or more machines and/or devices part of a system, such as an animal monitoring system, a farming system, a milking and/or feeding system. This may allow the system to be tailored to an individual animal (such as bovine animal) to improve a result of the system. In one or more examples, controlling a machine based on the identification of the bovine animal may comprise recording that the identified animal has been detected by the system at a given time. In one or more examples, controlling a machine based on the identification of the bovine animal may comprise informing a user (such as, a farmer and/or a veterinarian) about the identification of the bovine animal by transmitting a notification through an interface (such as, interface 503 of FIG. 9). The user may be notified about an identifier associated with the identified bovine animal.

Figure 9:
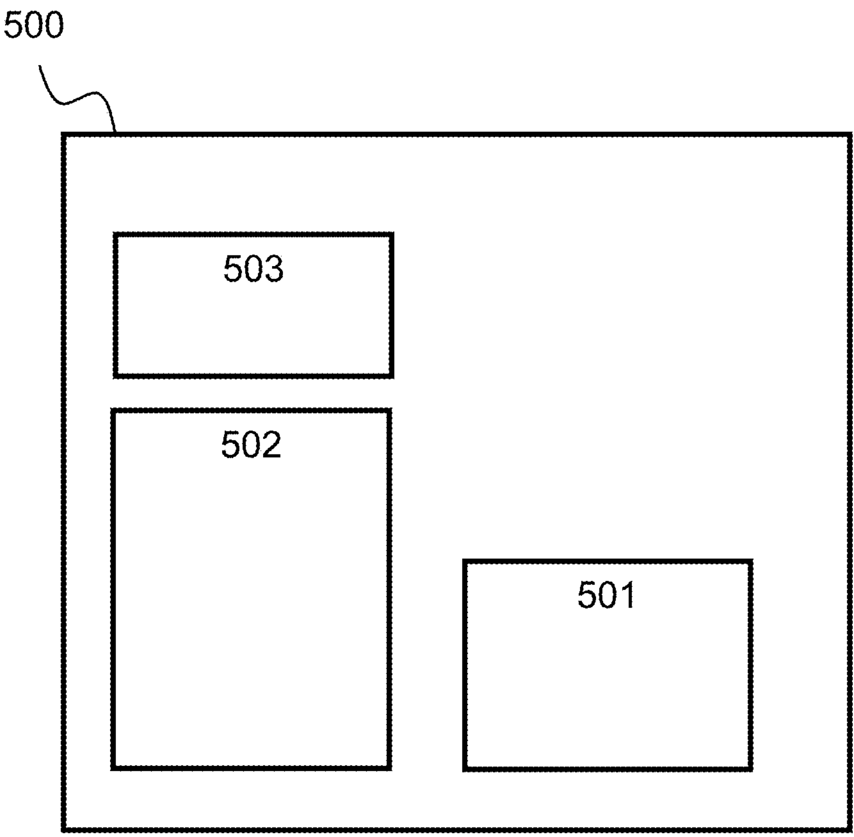
FIG. 9 is a block diagram illustrating an example first electronic device according to this disclosure.

FIG. 9 shows a block diagram of an electronic device 500 according to the disclosure. The electronic device 500 comprises memory circuitry 501, processor circuitry 502, and an interface 503. The electronic device 500 may be configured to perform any of the methods disclosed in FIGS. 8A-8B. In other words, the electronic device 500 may be configured for identifying an animal, such as a bovine animal, in an environment. The electronic device 500 may be seen as an animal monitoring device and/or an animal identifying device and/or a sensor configured to identify an animal, such as one or more of: walking mammals, livestock animals, and farming animals. An animal may be one or more of: a cow, a calf, a horse, a goat, a pig, and a sheep. In other words, an animal may be a bovine animal (e.g., cattle), a swine animal, an equine animal, and any other suitable animal breed.

The electronic device 500 may be part of a system, such as an animal monitoring system, a farming system, a milking and/or feeding system. In some examples, the electronic device 500 may be implemented as a device 300, 300A of FIG. 1 and/or as a remote device 400 of FIG. 1.

The interface 503 may be configured for wired and/or wireless communications.

The electronic device 500 is configured to obtain (such as, via the interface 503 and/or using the memory circuitry 501) first sensor data from a first sensor of a first type. The first sensor data comprises two-dimensional image data representative of the bovine animal in the environment.

The electronic device 500 is configured to obtain (such as, via the interface 503 and/or using the memory circuitry 501) second sensor data from a second sensor of a second type. The second type is different from the first type. The second sensor data is indicative of one or more distances associated with the environment.

The electronic device 500 is configured to generate (such as, using the processor circuitry 502), based on the first sensor data, a first feature vector.

The electronic device 500 is configured to generate (such as, using the processor circuitry 502), based on the second sensor data, a second feature vector.

The electronic device 500 is configured to generate (such as, using the processor circuitry 502), based on the first feature vector and the second feature vector, a third feature vector.

The electronic device 500 is configured to identify (such as, using the processor circuitry 502) the bovine animal based on the third feature vector.

In one or more example electronic devices, the first sensor of the first type is a two-dimensional camera, wherein the first sensor has the same field of view as the second sensor.

In one or more example electronic devices, the first sensor of the first type is a Red Green Blue camera and/or a monochrome camera.

In one or more example electronic devices, the second sensor of the second type is a three-dimensional camera.

In one or more example electronic devices, the second sensor of the second type is a Time of Flight camera.

In one or more example electronic devices, the second sensor data comprises one or more three-dimensional coordinates associated with each element of the environment and the bovine animal, and/or one or more point clouds.

In one or more example electronic devices, the electronic device 500 is configured to pre-process (such as, using the processor circuitry 502) the second sensor data.

In one or more example electronic devices, the pre-processing of the second sensor data comprises removing (such as, using the processor circuitry 502), from the second sensor data, one or more of: background data associated with a background in the environment, and body part data associated with parts of the body of the bovine animal.

In one or more example electronic devices, the parts of the body to be removed include a head, a neck area, a shoulder area, a part of a back area, and/or a tail of the bovine animal.

In one or more example electronic devices, the pre-processing of the second sensor data comprises transforming (such as, using the processor circuitry 502) the second sensor data.

In one or more example electronic devices, the generation of the first feature vector comprises applying (such as, using the processor circuitry 502) a deep learning technique to the first sensor data.

In one or more example electronic devices, the generation of the second feature vector comprises dividing (such as, using the processor circuitry 502) the second sensor data into a number of bins associated with a width and a length along an x-axis of the second sensor. In one or more example electronic devices, the x-axis is substantially aligned with a spine of the bovine animal.

In one or more example electronic devices, the generation of the second feature vector comprises determining (such as, using the processor circuitry 502), based on the second sensor data, one or more spine points corresponding to a spine area of the bovine animal.

In one or more example electronic devices, the electronic device 500 is configured to determine the one or more spine points corresponding to a spine area of the bovine animal by determining (such as, using the processor circuitry 502) for each bin, as a spine point of the one or more spine points, a highest point on a z-axis of the second sensor.

In one or more example electronic devices, the electronic device 500 is configured to determine the one or more spine points corresponding to a spine area of the bovine animal by including (such as, using the processor circuitry 502), for each bin, for each spine point, as part of the one or more spine points, one or more points that have a distance to the spine point that is smaller than a distance threshold.

In one or more example electronic devices, the generation of the second feature vector comprises determining (such as, using the processor circuitry 502), for each spine point, the second feature vector for each height level based on a length of a bin for each spine point. In one or more example electronic devices, the length of each bin is determined by each distance threshold from each spine point. In one or more example electronic devices, each height level corresponds to a respective distance threshold.

In one or more example electronic devices, the generation of the second feature vector comprises determining (such as, using the processor circuitry 502), based on the second sensor data, one or more hip points corresponding to a hip bone area of the bovine animal. In one or more example electronic devices, the second feature vector includes the one or more hip points.

In one or more example electronic devices, the electronic device 500 is configured to determine (such as, using the processor circuitry 502) the one or more hip points by determining the widest bin amongst the number of bins.

In one or more example electronic devices, the electronic device 500 is configured to determine the one or more hip points by determining (such as, using the processor circuitry 502), as part of the one or more hip points, the points that are associated with a pre-determined number of bins above and below the widest bin.

In one or more example electronic devices, the electronic device 500 is configured to obtain the second sensor data by determining (such as, using the processor circuitry 502) whether the second sensor data meets a criterion.

In one or more example electronic devices, the electronic device is configured to obtain the second sensor data by, upon the second sensor data meeting the criterion, storing (such as, via the processor circuitry 502 and/or using the memory circuitry 501) the second sensor data.

In one or more example electronic devices, the generation of the third feature vector comprises combining (such as, using the processor circuitry 502) the first sensor data with the second sensor data using a feature reduction technique.

In one or more example electronic devices, the feature reduction technique comprises an artificial neural network and/or a linear discriminant analysis.

In one or more example electronic devices, the electronic device 500 is configured to control (such as, using the processor circuitry 502) a machine based on the identification of the bovine animal.

In one or more example electronic devices, the generation of the third feature vector comprises determining (such as, using the processor circuitry 502) a confidence score associated with the third feature vector. In one or more example electronic devices, the confidence score indicates how much the third feature vector matches a previously generated third feature vector associated with an already identified bovine animal.

In one or more example electronic devices, the generation of the third feature vector comprises determining (such as, using the processor circuitry 502) whether the confidence score meets a first criterion.

In one or more example electronic devices, the generation of the third feature vector comprises, upon determining that the confidence score meets the first criterion, identifying the bovine animal as the already identified bovine animal. In one or more example electronic devices, the generation of the third feature vector comprises storing (such as, via the processor circuitry 502 and/or using the memory circuitry 501) the first sensor data and the second sensor data for further identification.

In one or more example electronic devices, the generation of the third feature vector comprises, upon determining that the confidence score meets the first criterion, identifying the bovine animal as a new bovine animal.

Processor circuitry 502 is optionally configured to perform any of the operations disclosed in FIGS. 8A-8B (such as any one or more of S102, S104, S104A, S104B, S105, S105A, S105B, S106, S106A, S108, S108A, S108B, S108BA, S108BB, S108C, S108D, S108DA, S108DB, S110, S110A, S110B, S110C, S110D, S110E, S110F, S112, S114). The operations of the electronic device 500 may be embodied in the form of executable logic routines (for example, lines of code, software programs, etc.) that are stored on a non-transitory computer readable medium (for example, memory circuitry 501) and are executed by processor circuitry 502.

Furthermore, the operations of the electronic device 500 may be considered a method that the electronic device 500 is configured to carry out. Also, while the described functions and operations may be implemented in software, such functionality may also be carried out via dedicated hardware or firmware, or some combination of hardware, firmware and/or software.

Memory circuitry 501 may be one or more of: a buffer, a flash memory, a hard drive, a removable media, a volatile memory, a non-volatile memory, a random access memory (RAM), and any other suitable device. In a typical arrangement, memory circuitry 501 may include a non-volatile memory for long term data storage and a volatile memory that functions as system memory for processor circuitry 502.

Memory circuitry 501 may exchange data with processor circuitry 502 over a data bus. Control lines and an address bus between memory circuitry 501 and processor circuitry 502 also may be present (not shown in FIG. 9). Memory circuitry 501 is considered a non-transitory computer readable medium.

Memory circuitry 501 may be configured to store one or more of: the first sensor data, the second sensor data, the first feature vector, the second feature vector, the one or more spine points, the one or more hip points, the third feature vector, and the confidence score in a part of the memory.

FIG. 10 shows a flow-chart of an example method 200, performed by an electronic device according to the disclosure, for determining a lameness parameter associated with a bovine animal in an environment. The electronic device is the electronic device disclosed herein, such as electronic device 300, 300A of FIG. 1 and electronic device 600 of FIG. 11. The electronic device performing method 200 may be seen as an animal monitoring device and/or an animal identifying device and/or an electronic device configured to determine a lameness parameter associated with a bovine animal.

The disclosed method 200 may be applied to an animal, such as one or more of: walking mammals, livestock animals, and farming animals. The disclosed method 200 may be applied to one or more of: a bovine animal (e.g., cattle), a swine animal, an equine animal, and any other suitable animal breed. In other words, the disclosed method 200 may be applied to one or more of: a cow, a calf, a horse, a goat, a pig, and a sheep.

The method 200 comprises obtaining S202 sensor data from a sensor. In one or more examples, the sensor can be seen as a camera, with the camera comprising the sensor. The sensor data is indicative of one or more distances associated with the bovine animal in the environment. In one or more examples, the sensor can be one or more of: a structured light 3D camera, a Time-of-flight, ToF, camera, a 3D camera, a stereo 3D camera, a Light Detection and Ranging, LiDAR, camera, a 3D scanning system, and any other suitable 3D camera. In one or more example methods, the sensor is a Time of Flight, ToF, camera. In one or more examples, the sensor measures depth and distance. The sensor may be seen as a range imaging sensor. In one or more examples, the sensor measures, based on ToF, one or more distances between the sensor and each element of the environment including the bovine animal.

In one or more example methods, the sensor data comprises one or more three-dimensional, 3D, coordinates associated with each element of the environment and the bovine animal, and/or one or more point clouds. In one or more examples, the sensor measures a 3D coordinate (such as, a 3D position) of each element in the environment and the bovine animal by evaluating the time delay from when a light signal is emitted and when the reflected light signal is received by the second sensor. The one or more 3D coordinates may be seen as the one or more points clouds. In one or more examples, the sensor may allow measuring a size of each element comprised in the environment which includes the bovine animal. In one or more examples, the sensor data comprises a 3D representation (such as, 3D shape) of the bovine animal in the environment. The environment can include other objects than the bovine animal, like props and walls.

In one or more examples, S202 corresponds to S102 of FIGS. 8A-8B. The sensor data may correspond to second sensor data of FIGS. 8A-8B. The sensor may correspond to second sensor of FIGS. 8A-8B. FIG. 2 shows an example representation of the sensor data.

The method 200 comprises generating S206, based on the sensor data, a feature vector. The feature vector may be indicative of one or more spatial features of a part of the bovine animal, such as of a shape of a part of the bovine animal. The feature vector can be seen as a 3D feature vector, such as a ToF feature vector. In one or more examples, S206 corresponds to S108 of FIGS. 8A-8B. The feature vector may correspond to the second feature vector of FIGS. 8A-8B.

The method 200 comprises generating S208, based on the feature vector, a gait pattern indicative of a gait of the bovine animal. A gait pattern may be seen as a series of a movement of a limb of the bovine animal over time, such as the movement of a limb involved in the walking of the bovine animal. Put differently, a gait pattern may show how a position of a sacrum area of a bovine animal varies over time, such as in one or more gait (such as, walking) cycles. In other words, a gait pattern may be seen as a walking pattern. A gait pattern is for example illustrated by gait pattern 82, 84 of FIG. 7B.

The method 200 comprises determining S210, based on the gait pattern, the lameness parameter indicative of lameness of the bovine animal. The lameness parameter is for example a parameter indicating and/or quantifying a lameness condition (such as, a limping condition) associated with an animal, in which the animal shows signs of an abnormal gait and/or stance, such as a dysfunction of the locomotor system.

In one or more example methods, the sensor is a three-dimensional, 3D, camera.. In one or more examples, the sensor can be one or more of: a structured light 3D camera, a Time-of-flight, ToF, camera, a 3D camera, a stereo 3D camera, a Light Detection and Ranging, LiDAR, camera, a 3D scanning system, and any other suitable 3D camera.

In one or more example methods, the sensor is a Time of Flight, ToF, camera. In one or more examples, the sensor measures depth and distance. The sensor may be seen as a range imaging sensor. In one or more examples, the sensor measures, based on ToF, one or more distances between the sensor and each element of the environment including the bovine animal. The feature vector may be seen as a ToF feature vector.

In one or more example methods, the sensor is placed above a path (such as, a ground level) of the environment where the bovine animal is expected to walk. The ToF camera may record the bovine animal in the environment towards the ground level. In other words, for example, the sensor is placed sufficiently above the ground level or path to capture sensor data that is indicative of the bovine animal.

In one or more example methods, the sensor data comprises one or more three-dimensional, 3D, coordinates associated with each element of the environment and of the bovine animal, and/or one or more-point clouds. In one or more examples, the sensor measures a 3D coordinate (such as, a 3D position) of each element in the environment and the bovine animal by evaluating the time delay from when a light signal is emitted and when the reflected light signal is received by the sensor. The one or more 3D coordinates may be seen as the one or more points clouds. In one or more examples, the sensor may allow measuring a size of each element comprised in the environment which includes the bovine animal. In one or more examples, the sensor data comprises a 3D representation (such as, 3D shape) of the bovine animal in the environment. The environment can include other objects than the bovine animal, like props and walls.

In one or more example methods, the method 200 comprises pre-processing S205 the sensor data. In one or more examples, S205 corresponds to S105 of FIGS. 8A-8B applied to the sensor data instead of the second sensor data.

In one or more example methods, pre-processing S205 the sensor data comprises removing S205A, from the sensor data, one or more of: background data associated with a background in the environment, and body part data associated with a part of the body of the bovine animal. In one or more examples, removing the background data associated with a background in the environment comprises performing background subtraction on the sensor data for provision of the second sensor data (such as, an image) solely comprising the bovine animal. The background in the environment may comprise the surroundings of the bovine animal, such as one or more of: fences, dirt, milk machinery, feeders, and any other suitable element of the environment. In one or more examples, S205A corresponds to S105A of FIGS. 8A-8B applied to the sensor data instead of the second sensor data. In one or more example methods, the part of the body includes one or more of: a head, a neck area, a shoulder area, a part of a back area, and a tail of the bovine animal. This is part illustrated in FIG. 3 when compared to FIG. 2. In one or more examples, removing the body part data associated with parts of the body of the bovine animal may comprise aligning a spine of the bovine animal to an x-axis for provision of a normal vector of a floor plane. In one or more examples, the parts of the body are removed after aligning the spine of the bovine animal to an x-axis. For example, the parts of the body may be cropped off by removing one or more data columns associated with the sensor data whose sum is below a first threshold. As illustrated by image 30 of FIG. 3, the head and/or a part of the back area may be cropped off by removing the one or more data columns associated with the sensor data whose sum is below the first threshold. For example, the body of the bovine animal may be cropped by the shoulder area and/or neck area when the neck area is thin, as illustrated by image 30 of FIG. 3.

In one or more example methods, pre-processing S205 the sensor data comprises transforming S205B the sensor data. In one or more examples, transforming the sensor data comprises a camera tilt correction, such as a sensor tilt correction. In one or more examples, transforming the sensor data comprises determining a normal vector of a floor plane. In one or more examples, determining the normal vector of a floor plane comprises determining one or more parameters representative of position and tilt of the floor (such as in relation to the second sensor (such as, the ToF camera). The present disclosure may allow a normalised view of a bovine animal (and/or of a plurality of bovine animals) in the 3D space (e.g., a point cloud space) associated with the second sensor. In one or more examples, transforming the sensor data comprises rotating the one or more 3D coordinates (such as, point cloud coordinates) based on the normal vector of the floor plane. Stated differently, transforming the sensor data comprises aligning the normal vector of the floor plane with a z-axis in a 3D space associated the sensor data. In one or more examples, S205B corresponds to S105B of FIGS. 8A-8B applied to the sensor data instead of the second sensor data.

In one or more example methods, generating S206, based on the sensor data, the feature vector comprises dividing S206A the sensor data into a number of bins associated with a width and a length along an x-axis of the sensor. In one or more example methods, the x-axis is substantially aligned with a spine of the bovine animal. In one or more examples, S206A corresponds to S108A of FIGS. 8A-8B applied to the sensor data instead of the second sensor data.

In one or more example methods, generating S206, based on the sensor data, the feature vector comprises determining S206B, based on the sensor data, one or more spine points corresponding to a spine area of the bovine animal. In one or more examples, S206B corresponds to S108B of FIGS. 8A-8B applied to the sensor data instead of the second sensor data.

In one or more example methods, determining S206B the one or more spine points corresponding to a spine area of the bovine animal comprises determining S206BA, for each bin, as a spine point of the one or more spine points, a highest point on a z-axis of the sensor. In one or more examples, S206BA corresponds to S108BA of FIGS. 8A-8B. In other words, in each bin, the highest point on the z-axis may be assigned as a spine point of the one or more spine points.

In one or more example methods, determining S206B the one or more spine points corresponding to a spine area of the bovine animal comprises including S206BB, for each bin, for each spine point, as part of the one or more spine points, one or more points that have a distance to the spine point that is smaller than or equal to a distance threshold (such as, a distance threshold of 50 mm). In one or more examples, S206BB corresponds to S108BB of FIGS. 8A-8B.

In one or more example methods, generating S206, based on the sensor data, the feature vector comprises determining S206C, for each spine point, the feature vector for a height level based on a length of a bin for each spine point. In one or more example methods, the height level corresponds to the distance threshold. In one or more examples, S206C may be similar to S108C of FIGS. 8A-8B.

In one or more example methods, generating S206, based on the sensor data, the feature vector comprises determining S206D, based on the sensor data, one or more hip points corresponding to a hip bone area of the bovine animal. In one or more example methods, the feature vector includes the one or more hip points. In one or more examples, S206D corresponds to S108D of FIGS. 8A-8B.

In one or more example methods, determining S206D the one or more hip points comprises determining S206DA the widest bin amongst the number of bins. In one or more examples, S206DA corresponds to S108DA of FIGS. 8A-8B. In one or more examples, the widest bin is related to a hip bone area of the bovine animal. In one or more examples, cross section 72 (such as, one or more hip points) of FIG. 7A can be seen as the widest bin.

In one or more example methods, generating S206, based on the sensor data, the feature vector comprises determining S206E, based on the widest bin, one or more points associated with a sacrum area of the bovine animal (such as sacrum area 78B of FIG. 7A).

In one or more example methods, determining S206E the one or more points associated with the sacrum area comprises dividing S206EA the widest bin into a first part (such as, first part 80A of FIG. 7A), a second part (such as, first part 80B of FIG. 7A) and a third part (such as, first part 80C of FIG. 7A) along a y-axis. In one or more example methods, determining S206E the one or more points associated with the sacrum area comprises determining S206EB, based on the second part of the widest bin, a highest hip point corresponding to the sacrum area of the bovine animal. In one or more examples, the widest bin is divided into thirds along the y-axis, as illustrated in FIG. 7A. The highest hip point may be the highest point (such as, highest hip point 78B of FIG. 7A) in the second part of the widest bin. The position of the highest hip point (and/or another point in close proximity to the highest hip point) may correspond to the position the sacrum area of the bovine animal.

In one or more example methods, generating S206, based on the sensor data, the feature vector comprises determining S206F a convex hull (such as, convex hull 70 of FIG. 7A) associated with the one or more hip points of the widest bin. In one or more examples, a convex hull can be seen as a subset of points that form the smallest geometrical shape which have no indentations. A convex hull of a set of points may be seen as the smallest convex polygon which comprises all the points in the set.

In one or more example methods, generating S206, based on the sensor data, the feature vector comprises determining S206G, based on the convex hull, a first pair of hip points (such as, first pair 74A,74B of FIG. 7A) and a second pair of hip points (such as, second pair 76A, 76B of FIG. 7A). In one or more example methods, each one of the first pair and the second pair meets a first criterion. In one or more example methods, the first pair includes a first hip point (such as, first hip point 74A of FIG. 7A) corresponding to a first hook bone of the bovine animal and a third hip point (such as, third primary hip point 74B of FIG. 7A) proximal to the highest hip point. In other words, the third point may be seen as a point in close proximity to the highest hip point in the second part of the widest bin (such as, a hip bin). In one or more example methods, the second pair includes a second hip point (such as, second hip point 76A of FIG. 7A) corresponding to a second hook bone of the bovine animal and the third point. Such third point may be different from the third point included in the first pair, such as third secondary hip point 76B of FIG. 7A.

In one or more examples, each one of the first pair and the second pair meets the first criterion when the first pair meets a first primary criterion, and the second pair meets a first secondary criterion. In other words, for example, the first pair meets the first primary criterion when a distance between the first hip point (such as, the first hook bone) and the third hip point proximal to the highest hip point (such as, the sacrum area), as illustrated in convex hull 70 of FIG. 7A. For example, the second pair meets the first secondary criterion when a distance between the second hip point (such as, the second hook bone) and the third hip point (such as, the sacrum area) are considerably large, as illustrated in convex hull 70 of FIG. 7A.

In one or more examples, determining the first hip point as the first hook bone of the bovine animal comprises determining a first distance between the first hip point and a third primary hip point proximal to the highest hip point. The first part of the widest bin may comprise the first hip point. In one or more examples, determining the convex hull comprises determining whether the first distance meets the first primary criterion. In one or more examples, determining the convex hull comprises, upon the first distance meeting the first criterion, selecting the first hip point as the first hook bone of the bovine animal. In one or more examples, the first distance meets the first criterion when the first distance is greater than a first convex hull distance threshold.

In one or more examples, determining the second hip point as the second hook bone of the bovine animal comprises determining a first secondary distance between the second hip point and a third secondary hip point proximal to the highest hip point. The third part of the widest bin may comprise the second hip point. In one or more examples, determining the convex hull comprises determining whether the second distance meets the first secondary criterion. In one or more examples, determining the convex hull comprises, upon the second distance meeting the first secondary criterion, selecting the second hip point as the second hook bone of the bovine animal. In one or more examples, the second distance meets the first secondary criterion when the second distance is greater than a second convex hull distance threshold.

The first convex hull distance threshold may be the same as the second convex hull distance threshold. The first convex hull distance threshold may be different from the second convex hull distance threshold.

In one or more example methods, generating S208, based on the feature vector, the gait pattern comprises generating S208A the gait pattern based on positions of the highest hip point across frames. In one or more examples, a gait pattern (such as, gait pattern 82, 84 of FIG. 7B) can be seen as a sacrum gait curve. In other words, a gait pattern may describe a sacrum area of a bovine animal over a number of frames (such as, over time). Put differently, a gait pattern may show how a position of the sacrum area of a bovine animal varies over a number of frames, such as in one or more gait (such as, walking) cycles. A gait pattern may be seen as a sinusoidal curve associated with an amplitude. The amplitude may be seen as the height difference between an adjacent valley point and a peak point of sinusoidal curve). Such amplitude may be used for determining the lameness parameter.

In one or more example methods, determining S210 the lameness parameter based on the gait pattern comprising determining S210A whether the gait pattern meets a second criterion. In one or more examples, determining whether the gait pattern meets the second criterion comprises determining whether the amplitude associated the gait pattern (such as, an average and/or a standard deviation of the amplitude) meets the second criterion.

In one or more example methods, determining S210 the lameness parameter based on the gait pattern comprising upon determining that the gait pattern meets the second criterion, determining S210B the lameness parameter as an indicator of presence of lameness. In one or more examples, the gait pattern meets the second criterion when the amplitude associated the gait pattern (such as the amplitude of a period in the gait pattern) is not equal to an amplitude threshold (or does not fall into a range of amplitude). The amplitude threshold value may be related with a specific animal breed. In other words, different animal breeds may have different amplitude thresholds due to structural and/or morphologic reasons. In one or more examples, the gait pattern meets the second criterion when the gait pattern comprises an asymmetrical appearance, such as the gait pattern is approximately described with an asymmetrical curve (such as, gait pattern 84 of FIG. 7B). The asymmetry may be determined based on a threshold between the difference in amplitude between neighbouring periods of the gait pattern. A gait pattern meeting the second criteria may be associated with a lame bovine animal. A gait pattern not meeting the second criteria may be seen as an abnormal gait pattern.

In one or more example methods, determining S210 the lameness parameter based on the gait pattern comprising upon determining that the gait pattern does not meet the second criterion, determining S210C the lameness parameter as an indicator of absence of lameness. In one or more examples, the gait pattern does not meet the second criterion when the amplitude associated the gait pattern is equal to the amplitude threshold (or falls into a range of amplitude). In one or more examples, the gait pattern meets the second criterion when the gait pattern approximately comprises a symmetrical appearance, such as the gait pattern is approximately described with a symmetrical curve (such as, gait pattern 82 of FIG. 7B). A gait pattern not meeting the second criteria may be associated with a healthy bovine animal. A gait pattern not meeting the second criteria may be seen as a normal gait pattern. The amplitude associated the gait pattern may be of 35 mm on average for a healthy bovine animal, as illustrated in FIG. 7B. In some examples, an amplitude threshold may beset individually for each bovine animal.

The present disclosure allows generation of an individual gait pattern for a specific animal (such as a specific bovine animal). In other words, the present disclosure provides an updated and personalised profile of the gait pattern of a particular animal.

In one or more example methods, the method 200 comprises determining S203 whether the sensor data meets a criterion. In one or more example methods, the method 200 comprises, upon the sensor data meeting the criterion, storing S204 the sensor data. In one or more example methods, the method 200 comprises, upon the sensor data not meeting the criterion, forgoing the storing of the sensor data, and optionally the generation of the feature vector.

In one or more examples, the present disclosure may allow a more accurate and automatic identification of an event, such as an action in the environment. The sensor may be configured to store sensor data (e.g., one or more images) as a response to such event. The sensor may be configured to start storing the sensor data when an animal, such as a bovine animal, enters the field of view of the second sensor. In other words, the sensor data meets the criterion when an animal, such as a bovine animal, enters the field of view of the sensor. In one or more examples, S203 corresponds to S104A of FIGS. 8A-8B.

The electronic device may need to detect at least one gait cycle for determining the lameness parameter associated with the bovine animal. In other words, the electronic device may detect the bovine animal walking in the field of view of the sensor. The electronic device may store one or more images (samples) of the bovine animal walking in the environment to determine a lameness condition. The electronic device may store the one or more images associated with an entire walking passage of the bovine animal. The electronic device may comprise a single sensor to obtain the one or more images of the bovine animal (such as, of a round trip). The electronic may comprise one or more sensors (such as, multiple camera system) to obtain the one or more images of the bovine animal (such as, of a single trip). In other words, the sensor (and/or one or more sensors) may be placed at end parts of the field of view (such as, where the bovine animal is expected to enter and exit the field of view of the sensor) to detect changes. This may act as a trigger for starting and stopping storage (such as, recording) of sensor data. Targeting a monitoring around when an event is triggered may mitigate noise and/or unexpected events from triggering recording.

In one or more example methods, the method 200 comprises controlling S212 a machine based on the determination of the lameness parameter.

In one or more example methods, the method 200 comprises reporting S214 the lameness parameter to an external device (such as, external device 400 of FIG. 1). The external device may be seen as a remote electronic device that may be remotely installed in a barn and/or in a facility for remote monitoring of an activity of an animal. The external device may be one or more of: a back office electronic device (such as, a computer, a laptop, a PC, a tablet, and/or a mobile phone) and a server device (such as, part of a cloud architecture). In one or more examples, reporting the lameness parameter to an external device comprises informing a user (such as, a farmer and/or a veterinarian) based on the lameness parameter by transmitting a notification through an interface (such as, interface 603 of FIG. 11).

In one or more example methods, the lameness parameter is indicative of a severity degree of lameness of the bovine animal. In one or more examples, the method 200 comprises reporting the lameness parameter (optionally including and/or indicating a grading (such as, a range) of lameness, such as a grading of lameness of 0 to 4). For example, grade 1 can be indicative of non-detectable lameness. For example, grades 2 to 5 can be indicative of inconsistently apparent to obvious lameness. In one or more examples, the method 200 comprises increasing reporting speed of the lameness parameter for a grade of 5. In one or more examples, the user may be notified with a grade of lameness associated with the bovine animal.

In one or more example methods, the method comprises reporting the lameness parameter, such as to a user and/or to a system.

In one or more example methods, the method comprises transmitting a notification indicative of the lameness parameter to a user of the system.

In one or more example methods, the method comprises storing the lameness parameter associated with the bovine animal, such as associated with an identifier of the bovine animal.

The present disclosure may allow monitoring lameness (such as lameness levels) associated with the bovine animal by determining presence and a degree of severity of a lameness condition.

Figure 10A:
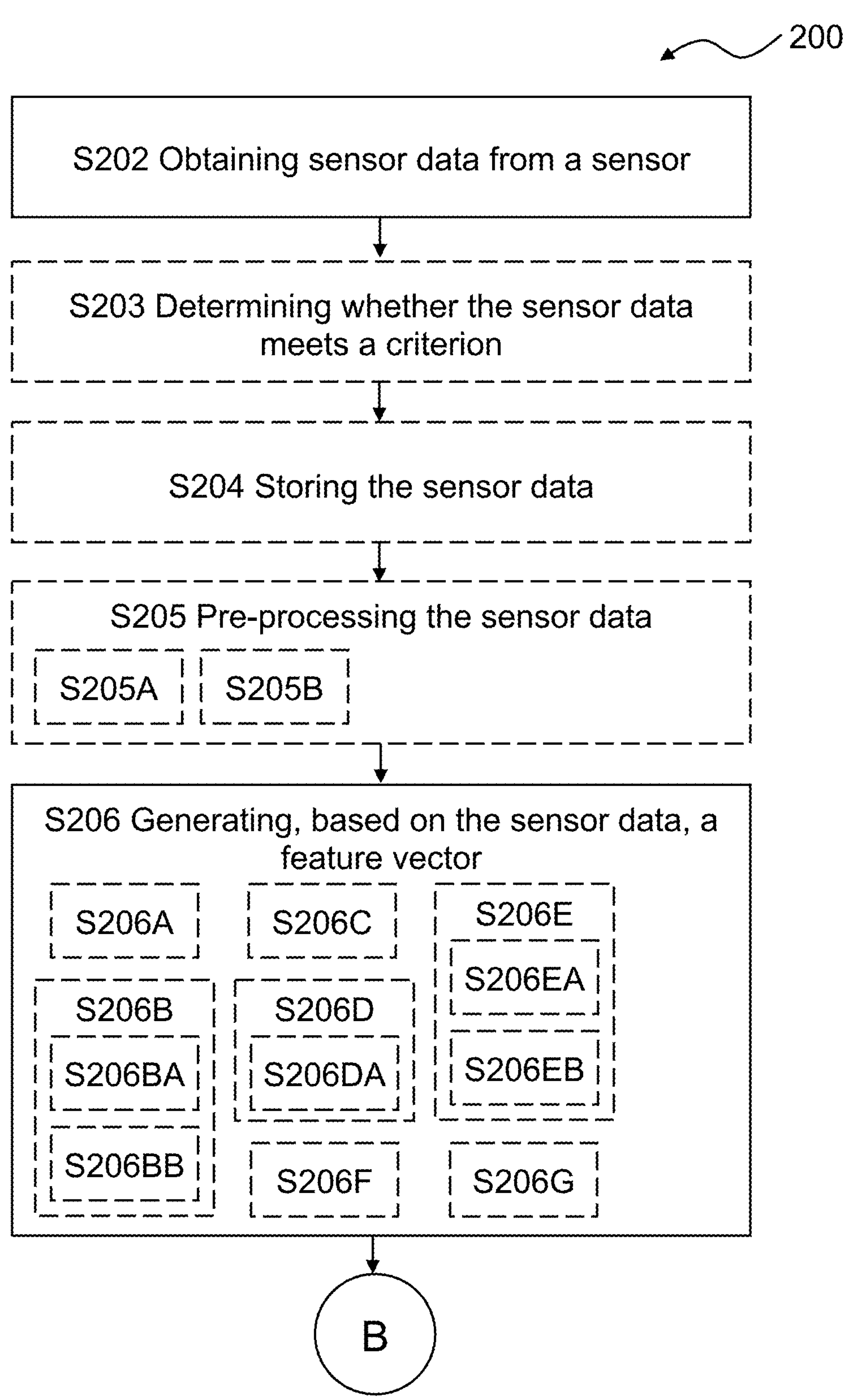
FIGS. 10A-10B show a flow-chart illustrating an example method, performed in a network node of a wireless communication system, for determining a lameness parameter associated with a bovine animal in an environment according to this disclosure.
Figure 10B:
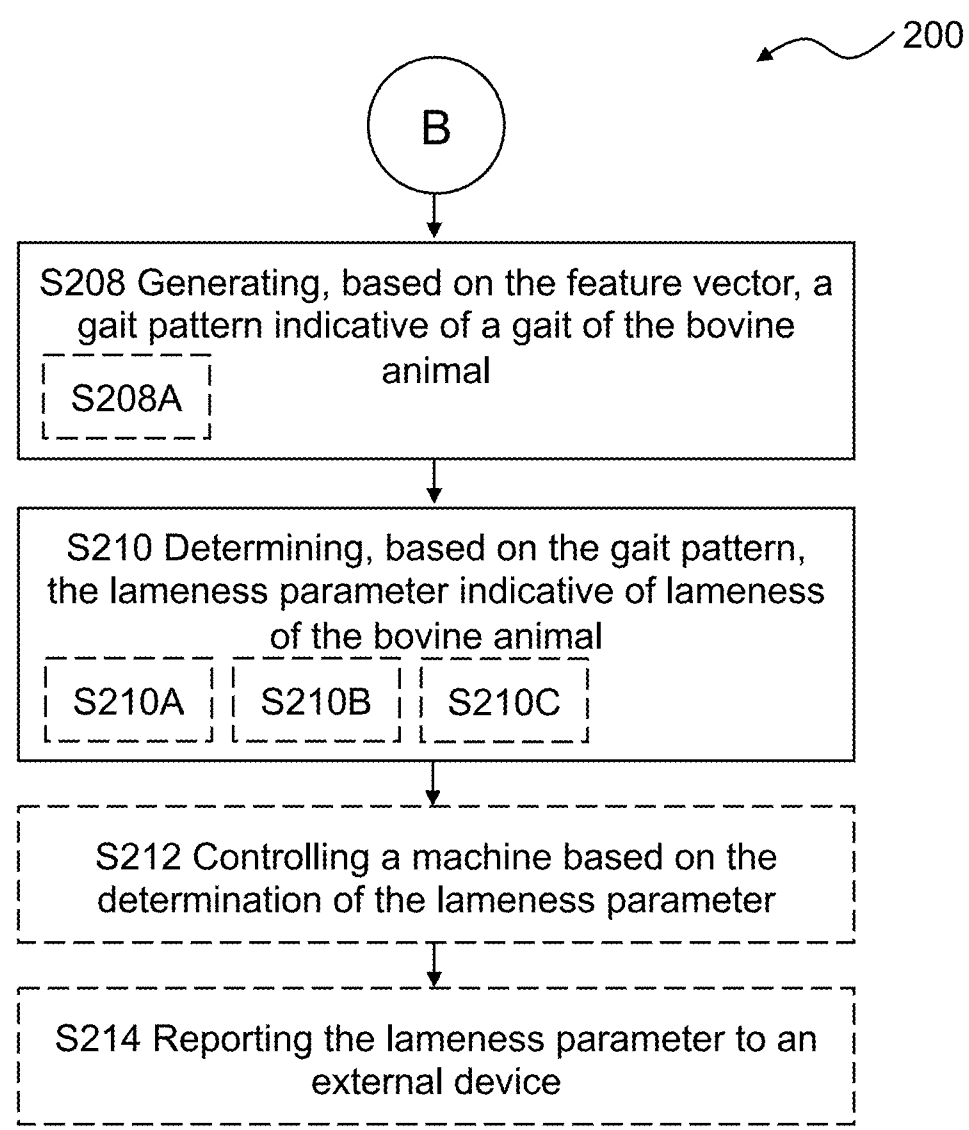
Figure 11:
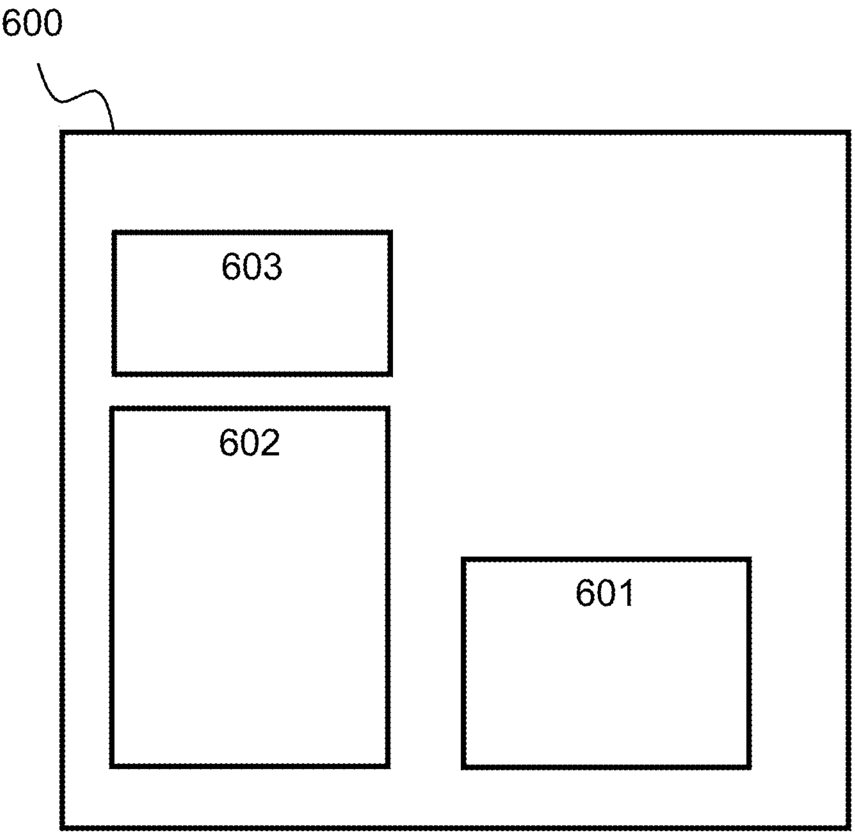
FIG. 11 is a block diagram illustrating an example second electronic device according to this disclosure.

FIG. 11 shows a block diagram of an example electronic device 600 according to the disclosure. The electronic device 600 comprises memory circuitry 601, processor circuitry 602, and an interface 603. The electronic device 600 may be configured to perform any of the methods disclosed in FIGS. 10A-10B. In other words, the electronic device 600 may be configured for determining a lameness parameter associated with an animal, such as a bovine animal, in an environment. The electronic device 500 may be seen as an animal monitoring device and/or an animal identifying device and/or a sensor configured to determine a lameness parameter associated with an animal, such as one or more of: walking mammals, livestock animals, and farming animals. An animal may be one or more of: a cow, a calf, a horse, a goat, a pig, and a sheep. In other words, an animal may be a bovine animal (e.g., cattle), a swine animal, an equine animal, and any other suitable animal breed.

The interface 603 may be configured for wired and/or wireless communications.

The electronic device 600 may be part of a system, such as an animal monitoring system, a farming system, a milking and/or feeding system. In some examples, the electronic device 500 may be implemented as a device 300, 300A of FIG. 1 and/or as a remote device 400 of FIG. 1.

The electronic device 600 is configured to obtain (such as, via the interface 603 and/or using the memory circuitry 601) sensor data from a sensor. The sensor data is indicative of one or more distances associated with the bovine animal in the environment.

The electronic device 600 is configured to generate (such as, using the processor circuitry 602), based on the sensor data, a feature vector.

The electronic device 600 is configured to generate (such as, using the processor circuitry 602), based on the feature vector, a gait pattern indicative of a gait of the bovine animal.

The electronic device 600 is configured to determine (such as, using the processor circuitry 602), based on the gait pattern, the lameness parameter indicative of lameness of the bovine animal.

In one or more example electronic devices, the sensor is a three-dimensional camera.

In one or more example electronic devices, the sensor is a Time of Flight camera.

In one or more example electronic devices, the sensor is placed above a path of the environment where the bovine animal is expected to walk.

In one or more example electronic devices, the sensor data comprises one or more three-dimensional coordinates associated with each element of the environment and of the bovine animal, and/or one or more-point clouds.

In one or more example electronic devices, the electronic device 600 is configured to pre-process (such as, using the processor circuitry 602) the sensor data.

In one or more example electronic devices, the pre-processing of the sensor data comprises removing (such as, using the processor circuitry 602), from the sensor data, one or more of: background data associated with a background in the environment, and body part data associated with a part of the body of the bovine animal In one or more example electronic devices, the part of the body includes one or more of: a head, a neck area, a shoulder area, a part of a back area, and a tail of the bovine animal.

In one or more example electronic devices, the pre-processing of the sensor data comprises transforming (such as, using the processor circuitry 602) the sensor data.

In one or more example electronic devices, the generation of the feature vector comprises dividing (such as, using the processor circuitry 602) the sensor data into a number of bins associated with a width and a length along an x-axis of the sensor. In one or more example electronic devices, the x-axis is substantially aligned with a spine of the bovine animal.

In one or more example electronic devices, the generation of the feature vector comprises determining (such as, using the processor circuitry 602), based on the sensor data, one or more spine points corresponding to a spine area of the bovine animal.

In one or more example electronic devices, the electronic device 600 is configured to determine the one or more spine points corresponding to a spine area of the bovine animal by determining (such as, using the processor circuitry 602), for each bin, as a spine point of the one or more spine points, a highest point on a z-axis of the sensor.

In one or more example electronic devices, the electronic device is configured to determine the one or more spine points corresponding to a spine area of the bovine animal by including (such as, using the processor circuitry 602), for each bin, for each spine point, as part of the one or more spine points, one or more points that have a distance to the spine point that is smaller than a distance threshold.

In one or more example electronic devices, the generation of the feature vector comprises determining (such as, using the processor circuitry 602), for each spine point, the feature vector for a height level based on a length of a bin for each spine point. In one or more example electronic devices, the height level corresponds to the distance threshold.

In one or more example electronic devices, the generation of the feature vector comprises determining (such as, using the processor circuitry 602), based on the sensor data, one or more hip points corresponding to a hip bone area of the bovine animal. In one or more example electronic devices, the feature vector includes the one or more hip points.

In one or more example electronic devices, the determination of the one or more hip points comprises determining (such as, using the processor circuitry 602) the widest bin amongst the number of bins.

In one or more example electronic devices, the generation of the feature vector comprises determining (such as, using the processor circuitry 602), based on the widest bin, one or more points associated with a sacrum area of the bovine animal.

In one or more example electronic devices, the electronic device 600 is configured to determine the one or more points associated with the sacrum area by dividing (such as, using the processor circuitry 602) the widest bin into a first part, a second part and a third part along a y-axis.

In one or more example electronic devices, the electronic device 600 is configured to determine the one or more points associated with the sacrum area by determining (such as, using the processor circuitry 602), based on the second part of the widest bin, a highest hip point corresponding to the sacrum area of the bovine animal.

In one or more example electronic devices, the generation of the feature vector comprises determining (such as, using the processor circuitry 602) a convex hull associated with the one or more hip points of the widest bin.

In one or more example electronic devices, the electronic device 600 is configured to generate, based on the sensor data, the feature vector by determining (such as, using the processor circuitry 602), based on the convex hull, a first pair of hip points, and a second pair of hip points. In one or more example electronic devices, each one of the first pair and the second pair meets a first criterion. In one or more example electronic devices, the first pair includes a first hip point corresponding to a first hook bone of the bovine animal and a third hip point proximal to the highest hip point. In one or more example electronic devices, the second pair includes a second hip point corresponding to a second hook bone of the bovine animal and the third point.

In one or more example electronic devices, the generation of the gait pattern comprises generating (such as, using the processor circuitry 602) the gait pattern based on positions of the highest hip point across frames.

In one or more example electronic devices, the electronic device 600 is configured to determine the lameness parameter based on the gait pattern by determining (such as, using the processor circuitry 602) whether the gait pattern meets a second criterion.

In one or more example electronic devices, the electronic device 600 is configured to determine the lameness parameter based on the gait pattern by, upon determining that the lameness parameter meets the second criterion, determining (such as, using the processor circuitry 602) the lameness parameter as an indicator of presence of lameness.

In one or more example electronic devices, the electronic device 600 is configured to determine the lameness parameter based on the gait pattern by, upon determining that the lameness parameter does not meet the second criterion, determining (such as, using the processor circuitry 602) the lameness parameter as an indicator of absence of lameness.

In one or more example electronic devices, the electronic device 600 is configured to determine (such as, using the processor circuitry 602) whether the sensor data meets a criterion.

In one or more example electronic devices, the electronic device 600 is configured to, upon the sensor data meeting the criterion, store (such as, using the processor circuitry 602 and/or using the memory circuitry 601) the sensor data.

In one or more example electronic devices, the electronic device 600 is configured to control (such as, using the processor circuitry 602) a machine based on the determination of the lameness parameter.

In one or more example electronic devices, the electronic device 600 is configured to report (such as, via the interface 603) the lameness parameter to an external device.

In one or more example electronic devices, the lameness parameter is indicative of a severity degree of lameness of the bovine animal.

The electronic device 600 is optionally configured to perform any of the operations disclosed in FIGS. 10A-10B (such as any one or more of: S202, S203, S204, S205, S205A, S205B, S206, S206A, S206B, S206BA, S206BB, S206C, S206D, S206DA, S206E, S206EA, S206EB, S206F, S206G, S208, S208A, S210, S210A, S210B, S210C, S212, S214). The operations of the electronic device 600 may be embodied in the form of executable logic routines (for example, lines of code, software programs, etc.) that are stored on a non-transitory computer readable medium (for example, memory circuitry 601) and are executed by processor circuitry 602.

Furthermore, the operations of the electronic device 600 may be considered a method that the electronic device 600 is configured to carry out. Also, while the described functions and operations may be implemented in software, such functionality may also be carried out via dedicated hardware or firmware, or some combination of hardware, firmware and/or software.

Memory circuitry 601 may be one or more of: a buffer, a flash memory, a hard drive, a removable media, a volatile memory, a non-volatile memory, a random access memory (RAM), and any other suitable device. In a typical arrangement, memory circuitry 601 may include a non-volatile memory for long term data storage and a volatile memory that functions as system memory for processor circuitry 602. Memory circuitry 601 may exchange data with processor circuitry 602 over a data bus. Control lines and an address bus between memory circuitry 601 and processor circuitry 602 also may be present (not shown in FIG. 11). Memory circuitry 601 is considered a non-transitory computer readable medium.

Memory circuitry 601 may be configured to store one or more of: the sensor data, the feature vector, the one or more spine points, the one or more hip points, the gait pattern, and the lameness parameter in a part of the memory.

Examples of methods and products (electronic device and method) according to the disclosure are set out in the following items:

Item A1. An electronic device comprising memory circuitry, processor circuitry, and an interface, wherein the electronic device is configured to: obtain first sensor data from a first sensor of a first type, wherein the first sensor data comprises two-dimensional image data representative of a bovine animal in an environment;
- obtain second sensor data from a second sensor of a second type, wherein the second type is different from the first type, and wherein the second sensor data is indicative of one or more distances associated with the environment;
- generate, based on the first sensor data, a first feature vector;
- generate, based on the second sensor data, a second feature vector;
- generate, based on the first feature vector and the second feature vector, a third feature vector; and
- identify the bovine animal based on the third feature vector.

Item A2. The electronic device according to item A1, wherein the first sensor of the first type is a two-dimensional camera, wherein the first sensor has the same field of view as the second sensor.

Item A3. The electronic device according to any of the previous items, wherein the first sensor of the first type is a Red Green Blue camera and/or a monochrome camera.

Item A4. The electronic device according to any of the previous items, wherein the second sensor of the second type is a three-dimensional camera.

Item A5. The electronic device according to any of the previous items, wherein the second sensor of the second type is a Time of Flight camera.

Item A6. The electronic device according to any of the previous items, wherein the second sensor data comprises one or more three-dimensional coordinates associated with each element of the environment and the bovine animal, and/or one or more point clouds.

Item A7. The electronic device according to any of the previous items, wherein the electronic device is configured to pre-process the second sensor data.

Item A8. The electronic device according to item A7, wherein the pre-processing of the second sensor data comprises removing, from the second sensor data, one or more of: background data associated with a background in the environment, and body part data associated with parts of the body of the bovine animal.

Item A9. The electronic device according to item A8, wherein the parts of the body to be removed include a head, a neck area, a shoulder area, a part of a back area, and/or a tail of the bovine animal.

Item A10. The electronic device according to any of items A7-A9, wherein the pre-processing of the second sensor data comprises transforming the second sensor data.

Item A11. The electronic device according to any of the previous items, wherein the generation of the first feature vector comprises applying a deep learning technique to the first sensor data.

Item A12. The electronic device according any of the previous items, wherein the generation of the second feature vector comprises dividing the second sensor data into a number of bins associated with a width and a length along an x-axis of the second sensor, wherein the x-axis is substantially aligned with a spine of the bovine animal.

Item A13. The electronic device according any of the previous items, wherein the generation of the second feature vector comprises determining, based on the second sensor data, one or more spine points corresponding to a spine area of the bovine animal.

Item A14. The electronic device according to items A12 and A13, wherein the electronic device is configured to determine the one or more spine points corresponding to a spine area of the bovine animal by:
- determining, for each bin, as a spine point of the one or more spine points, a highest point on a z-axis of the second sensor; and including, for each bin, for each spine point, as part of the one or more spine points, one or more points that have a distance to the spine point that is smaller than a distance threshold.

Item A15. The electronic device according to any of items A12-A14, wherein the generation of the second feature vector comprises determining, for each spine point, the second feature vector for each height level based on a length of a bin for each spine point, wherein the length of each bin is determined by each distance threshold from each spine point, wherein each height level corresponds to a respective distance threshold.

Item A16. The electronic device according to any of the previous items, wherein the generation of the second feature vector comprises determining, based on the second sensor data, one or more hip points corresponding to a hip bone area of the bovine animal; wherein the second feature vector includes the one or more hip points.

Item A17. The electronic device according to items A12 and A15, wherein the electronic device is configured to determine the one or more hip points by:

determining the widest bin amongst the number of bins; and determining, as part of the one or more hip points, the points that are associated with a pre-determined number of bins above and below the widest bin.

Item A18. The electronic device according to any of the previous items, wherein the electronic device is configured to obtain the second sensor data by:

determining whether the second sensor data meets a criterion, and upon the second sensor data meeting the criterion, storing the second sensor data.

Item A19. The electronic device according to any of the previous items, wherein the generation of the third feature vector comprises combining the first sensor data with the second sensor data using a feature reduction technique.

Item A20. The electronic device according to item A19, wherein the feature reduction technique comprises an artificial neural network and/or a linear discriminant analysis.

Item A21. The electronic device according to any of the previous items, wherein the electronic device is configured to control a machine based on the identification of the bovine animal.

Item A22. The electronic device according to any of the previous items, wherein the generation of the third feature vector comprises:

determining a confidence score associated with the third feature vector, wherein the confidence score indicate how much the third feature vector matches a previously generated third feature vector associated with an already identified bovine animal; and determining whether the confidence score meets a first criterion.

Item A23. The electronic device according to item A22, wherein the generation of the third feature vector comprises:

upon determining that the confidence score meets the first criterion, identifying the bovine animal as the already identified bovine animal and storing the first sensor data and the second sensor data for further identification.

Item A24. The electronic device according to item A22, wherein the generation of the third feature vector comprises:

upon determining that the confidence score meets the first criterion, identifying the bovine animal as a new bovine animal.

Item A25. A method, performed by an electronic device, for identifying a bovine animal in an environment, the method comprising:

obtaining (S102) first sensor data from a first sensor of a first type, wherein the first sensor data comprises two-dimensional image data representative of the bovine animal in the environment;

obtaining (S104) second sensor data from a second sensor of a second type, wherein the second type is different from the first type, and wherein the second sensor data is indicative of one or more distances associated with the environment;

generating (S106), based on the first sensor data, a first feature vector;

generating (S108), based on the second sensor data, a second feature vector;

generating (S110), based on the first feature vector and the second feature vector, a third feature vector; and identifying (S112) the bovine animal based on the third feature vector.

Item A26. The method according to item A25, wherein the first sensor of the first type is a two-dimensional camera, wherein the first sensor has the same field of view as the second sensor.

Item A27. The method according to any of items A25-A26, wherein the first sensor of the first type is a Red Green Blue camera and/or a monochrome camera.

Item A28. The method according to any of items A25-A27, wherein the second sensor of the second type is a three-dimensional camera.

Item A29. The method according to any of items A25-A28, wherein the second sensor of the second type is a Time of Flight camera.

Item A30. The method according to any of items A25-A29, wherein the second sensor data comprises one or more three-dimensional coordinates associated with each element of the environment and the bovine animal, and/or one or more point clouds.

Item A31. The method according to any of items A25-A30, the method comprises pre-processing (S105) the second sensor data.

Item A32. The method according to item A31, wherein pre-processing (S105) the second sensor data comprises removing (S105A), from the second sensor data, one or more of: background data associated with a background in the environment, and body part data associated with parts of the body of the bovine animal.

Item A33. The method according to item A32, wherein the parts of the body to be removed include a head, a neck area, a shoulder area, a part of a back area, and/or a tail of the bovine animal.

Item A34. The method according to any of items A31-A33, wherein pre-processing (S105) the second sensor data comprises transforming (S105B) the second sensor data.

Item A35. The method according to any of items A25-A34, wherein generating (S106), based on the first sensor data, the first feature vector comprises applying (S106A) a deep learning technique to the first sensor data.

Item A36. The method according to any of items A25-A35, wherein generating (S108), based on the second sensor data, the second feature vector comprises dividing (S108A) the second sensor data into a number of bins associated with a width and a length along an x-axis of the second sensor, wherein the x-axis is substantially aligned with a spine of the bovine animal.

Item A37. The method according to any of items A25-A36, wherein generating (S108), based on the second sensor data, the second feature vector comprises determining (S108B), based on the second sensor data, one or more spine points corresponding to a spine area of the bovine animal.

Item A38. The method according to items A36 and A37, wherein determining (S108B) the one or more spine points corresponding to a spine area of the bovine animal comprises:

determining (S108BA), for each bin, as a spine point of the one or more spine points, a highest point on a z-axis of the second sensor; and including (S108BB), for each bin, for each spine point, as part of the one or more spine points, one or more points that have a distance to the spine point that is smaller than a distance threshold.

Item A39. The method according to any of items A36-A38, wherein generating (S108), based on the second sensor data, the second feature vector comprises determining (S108C), for each spine point, the second feature vector for each height level based on a length of a bin for each spine point, wherein the length of each bin is determined by each distance threshold from each spine point, wherein each height level corresponds to a respective distance threshold.

Item A40. The method according to any of items A25-A39, wherein generating (S108), based on the second sensor data, the second feature vector comprises determining (S108D), based on the second sensor data, one or more hip points corresponding to a hip bone area of the bovine animal; wherein the second feature vector includes the one or more hip points.

Item A41. The method according to items A36 and A39, wherein determining (S108D) the one or more hip points comprises:

determining (S108DA) the widest bin amongst the number of bins; and determining (S108DB), as part of the one or more hip points, the points that are associated with a predetermined number of bins above and below the widest bin.

Item A42. The method according to any of items A25-A41, wherein obtaining (S104) the second sensor data comprises:

determining (S104A) whether the second sensor data meets a criterion, and upon the second sensor data meeting the criterion, storing (S104B) the second sensor data.

Item A43. The method according to any of items A25-A42, wherein generating (S110) the third feature vector comprises combining (S110A) the first sensor data with the second sensor data using a feature reduction technique.

Item A44. The method according to item A43, wherein the feature reduction technique comprises an artificial neural network and/or a linear discriminant analysis.

Item A45. The method according to any of items A25-A44, the method comprising controlling (S114) a machine based on the identification of the bovine animal.

Item A46. The method according to any of items A25-A45, wherein generating (S110) the third feature vector comprises:

determining (S110B) a confidence score associated with the third feature vector, wherein the confidence score indicate how much the third feature vector matches a previously generated third feature vector associated with an already identified bovine animal; and determining (S110C) whether the confidence score meets a first criterion.

Item A47. The method according to item A46, wherein generating (S110) the third feature vector comprises:

upon determining that the confidence score meets the first criterion, identifying (S110D) the bovine animal as the already identified bovine animal and storing (S110E) the first sensor data and the second sensor data for further identification.

Item A48. The method according to item A46, wherein generating (S110) of the third feature vector comprises:

upon determining that the confidence score meets the first criterion, identifying (S110F) the bovine animal as a new bovine animal.

Item B1. An electronic device comprising memory circuitry, processor circuitry, and an interface, wherein the electronic device is configured to:

obtain sensor data from a sensor, wherein the sensor data is indicative of one or more distances associated with the bovine animal in the environment;

generate, based on the sensor data, a feature vector;

generate, based on the feature vector, a gait pattern indicative of a gait of the bovine animal; and determine, based on the gait pattern, the lameness parameter indicative of lameness of the bovine animal.

Item B2. The electronic device according to item B1, wherein the sensor is a three-dimensional camera.

Item B3. The electronic device according to any of items B1-B2, wherein the sensor is a Time of Flight camera.

Item B4. The electronic device according to any of items B1-B3, wherein the sensor is placed above a path of the environment where the bovine animal is expected to walk.

Item B5. The electronic device according to any of items B1-B4, wherein the sensor data comprises one or more three-dimensional coordinates associated with each element of the environment and of the bovine animal, and/or one or more-point clouds.

Item B6. The electronic device according to any of items B1-B5, wherein the electronic device is configured to pre-process the sensor data.

Item B7. The electronic device according to item B6, wherein the pre-processing of the sensor data comprises removing, from the sensor data, one or more of: background data associated with a background in the environment, and body part data associated with a part of the body of the bovine animal.

Item B8. The electronic device according to item B7, wherein the part of the body includes one or more of: a head, a neck area, a shoulder area, a part of a back area, and a tail of the bovine animal.

Item B9. The electronic device according to any of items B7-B8, wherein the pre-processing of the sensor data comprises transforming the sensor data.

Item B10. The electronic device according to any of items B1-B9, wherein the generation of the feature vector comprises dividing the sensor data into a number of bins associated with a width and a length along an x-axis of the sensor, wherein the x-axis is substantially aligned with a spine of the bovine animal.

Item B111. The electronic device according to any of items B1-B10, wherein the generation of the feature vector comprises determining, based on the sensor data, one or more spine points corresponding to a spine area of the bovine animal.

Item B12. The electronic device according to items B10 and B111, wherein the electronic device is configured to determine the one or more spine points corresponding to a spine area of the bovine animal by:

determining, for each bin, as a spine point of the one or more spine points, a highest point on a z-axis of the sensor; and including, for each bin, for each spine point, as part of the one or more spine points, one or more points that have a distance to the spine point that is smaller than a distance threshold.

Item B13. The electronic device according to any of items B10-B12, wherein the generation of the feature vector comprises determining, for each spine point, the feature vector for a height level based on a length of a bin for each spine point, wherein the height level corresponds to the distance threshold.

Item B14. The electronic device according to any of items B1-B13, wherein the generation of the feature vector comprises determining, based on the sensor data, one or more hip points corresponding to a hip bone area of the bovine animal, wherein the feature vector includes the one or more hip points.

Item B15. The electronic device according to items B10 and B14, wherein the determination of the one or more hip points comprises determining the widest bin amongst the number of bins.

Item B16. The electronic device according to item B15, wherein the generation of the feature vector comprises determining, based on the widest bin, one or more points associated with a sacrum area of the bovine animal.

Item B17. The electronic device according to item B16, wherein the electronic device is configured to determine the one or more points associated with the sacrum area by:

dividing the widest bin into a first part, a second part and a third part along a y-axis; and determining, based on the second part of the widest bin, a highest hip point corresponding to the sacrum area of the bovine animal.

Item B18. The electronic device according to any of items B115-B17, wherein the generation of the feature vector comprises determining a convex hull associated with the one or more hip points of the widest bin.

Item B19. The electronic device according to item B18, wherein the electronic device is configured to generate, based on the sensor data, the feature vector by:

determining, based on the convex hull, a first pair of hip points, and a second pair of hip points, wherein each one of the first pair and the second pair meets a first criterion, wherein the first pair includes a first hip point corresponding to a first hook bone of the bovine animal and a third hip point proximal to the highest hip point, and wherein the second pair includes a second hip point corresponding to a second hook bone of the bovine animal and the third point.

Item B20. The electronic device according to item B19, wherein the generation of the gait pattern comprises generating the gait pattern based on positions of the highest hip point across frames.

Item B21. The electronic device according to any of items B1-B20, wherein the electronic device is configured to determine the lameness parameter based on the gait pattern by:

determining whether the gait pattern meets a second criterion, upon determining that the lameness parameter meets the second criterion, determining the lameness parameter as an indicator of presence of lameness; and upon determining that the lameness parameter does not meet the second criterion, determining the lameness parameter as an indicator of absence of lameness.

Item B22. The electronic device according to any of items B1-B21, wherein the electronic device is configured to:

determining whether the sensor data meets a criterion; and upon the sensor data meeting the criterion, storing the sensor data.

Item B23. The electronic device according to any of items B1-B22, wherein the electronic device is configured to control a machine based on the determination of the lameness parameter.

Item B24. The electronic device according to any of items B1-B23, wherein the electronic device is configured to report the lameness parameter to an external device.

Item B25. The electronic device according to any of items B1-B24, wherein the lameness parameter is indicative of a severity degree of lameness of the bovine animal.

Item B26. A method, performed by an electronic device, for determining a lameness parameter associated with a bovine animal in an environment, the method comprising:

obtaining (S202) sensor data from a sensor, wherein the sensor data is indicative of one or more distances associated with the bovine animal in the environment;

generating (S206), based on the sensor data, a feature vector;

generating (S208), based on the feature vector, a gait pattern indicative of a gait of the bovine animal; and determining (S210), based on the gait pattern, the lameness parameter indicative of lameness of the bovine animal.

Item B27. The method according to item B26, wherein the sensor is a three-dimensional camera.

Item B28. The method according to any of item B26-B27, wherein the sensor is a Time of Flight camera.

Item B29. The method according to any of items B26-B28, wherein the sensor is placed above a path of the environment where the bovine animal is expected to walk.

Item B30. The method according to any of items B26-B29, wherein the sensor data comprises one or more three-dimensional coordinates associated with each element of the environment and of the bovine animal, and/or one or more-point clouds.

Item B31. The method according to any of items B26-B30, the method comprising pre-processing (S205) the sensor data.

Item B32. The method according to item B31, wherein pre-processing (S205) the sensor data comprises removing (S205A), from the sensor data, one or more of: background data associated with a background in the environment, and body part data associated with a part of the body of the bovine animal.

Item B33. The method according to item B32, wherein the part of the body includes one or more of: a head, a neck area, a shoulder area, a part of a back area, and a tail of the bovine animal.

Item B34. The method according to any of items B32-B33, wherein pre-processing (S205) the sensor data comprises transforming (S205B) the sensor data.

Item B35. The method according to any of items B26-B34, wherein generating (S206), based on the sensor data, the feature vector comprises dividing (S206A) the sensor data into a number of bins associated with a width and a length along an x-axis of the sensor, wherein the x-axis is substantially aligned with a spine of the bovine animal.

Item B36. The method according to any of items B26-B35, wherein generating (S206), based on the sensor data, the feature vector comprises determining (S206B), based on the sensor data, one or more spine points corresponding to a spine area of the bovine animal.

Item B37. The method according to items B35 and B36, wherein determining (S206B) the one or more spine points corresponding to a spine area of the bovine animal comprises:

determining (S206BA), for each bin, as a spine point of the one or more spine points, a highest point on a z-axis of the sensor; and including (S206BB), for each bin, for each spine point, as part of the one or more spine points, one or more points that have a distance to the spine point that is smaller than a distance threshold.

Item B38. The method according to any of items B35-B37, wherein generating (S206), based on the sensor data, the feature vector comprises determining (S206C), for each spine point, the feature vector for a height level based on a length of a bin for each spine point, wherein the height level corresponds to the distance threshold.

Item B39. The method according to any of items B26-B38, wherein generating (S206), based on the sensor data, the feature vector comprises determining (S206D), based on the sensor data, one or more hip points corresponding to a hip bone area of the bovine animal, wherein the feature vector includes the one or more hip points.

Item B40. The method according to items B35 and B39, wherein determining (S206D) the one or more hip points comprises:

determining (S206DA) the widest bin amongst the number of bins.

Item B41. The method according to item B40, wherein generating (S206), based on the sensor data, the feature vector comprises determining (S206E), based on the widest bin, one or more points associated with a sacrum area of the bovine animal.

Item B42. The method according to item B41, wherein determining (S206E) the one or more points associated with the sacrum area comprises:

dividing (S206EA) the widest bin into a first part, a second part and a third part along a y-axis; and determining (S206EB), based on the second part of the widest bin, a highest hip point corresponding to the sacrum area of the bovine animal.

Item B43. The method according to any of items B40-B42, wherein generating (S206), based on the sensor data, the feature vector comprises determining (S206F) a convex hull associated with the one or more hip points of the widest bin.

Item B44. The method according to item B43, wherein generating (S206), based on the sensor data, the feature vector comprises:

determining (S206G), based on the convex hull, a first pair of hip points, and a second pair of hip points, wherein each one of the first pair and the second pair meets a first criterion, wherein the first pair includes a first hip point corresponding to a first hook bone of the bovine animal and a third hip point proximal to the highest hip point, and wherein the second pair includes a second hip point corresponding to a second hook bone of the bovine animal and the third point.

Item B45. The method according to item B44, wherein generating (S208), based on the feature vector, the gait pattern comprises:

generating (S208A) the gait pattern based on positions of the highest hip point across frames.

Item B46. The method according to any of items B26-B45, wherein determining (S210) the lameness parameter based on the gait pattern comprising:

determining (S210A) whether the gait pattern meets a second criterion;

upon determining that the lameness parameter meets the second criterion, determining (S210B) the lameness parameter as an indicator of presence of lameness; and upon determining that the lameness parameter does not meet the second criterion, determining (S210C) the lameness parameter as an indicator of absence of lameness.

Item 47. The method according to any of items B26-B46, the method comprising:

determining (S203) whether the sensor data meets a criterion; and upon the sensor data meeting the criterion, storing (S204) the sensor data.

Item B48. The method according to any of items B26-B47, the method comprising controlling (S212) a machine based on the determination of the lameness parameter.

Item B49. The method according to any of items B26-B48, the method comprising reporting (S214) the lameness parameter to an external device.

Item B50. The method according to any of items B26-B49, wherein the lameness parameter is indicative of a severity degree of lameness of the bovine animal.

The use of the terms "first," "second," "third" and "fourth," "primary," "secondary," "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that the Figures comprise some circuitries or operations which are illustrated with a solid line and some circuitries, components, features, or operations which are illustrated with a dashed line. Circuitries or operations which are comprised in a solid line are circuitries, components, features, or operations which are comprised in the broadest example. Circuitries, components, features, or operations which are comprised in a dashed line are examples which may be comprised in, or a part of, or are further circuitries, components, features, or operations which may be taken in addition to circuitries, components, features, or operations of the solid line examples. It should be appreciated that these operations need not be performed in order presented. Furthermore, it should be appreciated that not all of the operations need to be performed. The example operations may be performed in any order and in any combination. It should be appreciated that these operations need not be performed in order presented. Circuitries, components, features, or operations which are comprised in a dashed line may be considered optional.

Other operations that are not described herein can be incorporated in the example operations. For example, one or more additional operations can be performed before, after, simultaneously, or between any of the described operations.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

The various example methods, devices, nodes, and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claims, and it will be made obvious to those skilled in the art that various changes and modifications may be made without departing from the scope of the claimed disclosure. The specification and drawings are, accordingly, to be regarded in an illustrative rather than restrictive sense. The claims are intended to cover all alternatives, modifications, and equivalents.

What is claimed is:

1. An electronic device comprising memory circuitry, processor circuitry, and an interface, wherein the electronic device is configured to:

obtain first sensor data from a first sensor of a first type, wherein the first sensor data comprises two-dimensional image data representative of a bovine animal in an environment;

obtain second sensor data from a second sensor of a second type, wherein the second type is different from the first type, and wherein the second sensor data is indicative of one or more distances associated with the environment;

generate, based on the first sensor data, a first feature vector;

generate, based on the second sensor data, a second feature vector, wherein the generation of the second feature vector comprises dividing the second sensor data into a number of bins associated with a width and a length along an x-axis of the second sensor, wherein the x-axis is substantially aligned with a spine of the bovine animal;

generate, based on the first feature vector and the second feature vector, a third feature vector; and identify the bovine animal based on the third feature vector.

2. The electronic device according to claim 1, wherein the first sensor of the first type is a two-dimensional camera, wherein the first sensor has the same field of view as the second sensor.

3. The electronic device according to claim 1, wherein the first sensor of the first type is a Red Green Blue camera and/or a monochrome camera.

4. The electronic device according to claim 1, wherein the second sensor of the second type is a three-dimensional camera.

5. The electronic device according to claim 1, wherein the second sensor of the second type is a Time of Flight camera.

6. The electronic device according to claim 1 wherein the second sensor data comprises one or more three-dimensional coordinates associated with each element of the environment and the bovine animal, and/or one or more point clouds.

7. The electronic device according to claim 1, wherein the electronic device is configured to pre-process the second sensor data.

8. The electronic device according to claim 7, wherein the pre-processing of the second sensor data comprises removing, from the second sensor data, one or more of: background data associated with a background in the environment, and body part data associated with parts of the body of the bovine animal.

9. The electronic device according to claim 8, wherein the parts of the body to be removed include a head, a neck area, a shoulder area, a part of a back area, and/or a tail of the bovine animal.

10. The electronic device according to claim 7, wherein the pre-processing of the second sensor data comprises transforming the second sensor data.

11. The electronic device according to claim 1, wherein the generation of the first feature vector comprises applying a deep learning technique to the first sensor data.

12. The electronic device according claim 1, wherein the generation of the second feature vector comprises determining, based on the second sensor data, one or more spine points corresponding to a spine area of the bovine animal.

13. The electronic device according to claim 1, wherein the electronic device is configured to determine the one or more spine points corresponding to a spine area of the bovine animal by:

determining, for each bin, as a spine point of the one or more spine points, a highest point on a z-axis of the second sensor; and including, for each bin, for each spine point, as part of the one or more spine points, one or more points that have a distance to the spine point that is smaller than a distance threshold.

14. The electronic device according to claim 1, wherein the generation of the second feature vector comprises determining, for each spine point, the second feature vector for each height level based on a length of a bin for each spine point, wherein the length of each bin is determined by each distance threshold from each spine point, wherein each height level corresponds to a respective distance threshold.

15. The electronic device according to claim 1, wherein the generation of the second feature vector comprises determining, based on the second sensor data, one or more hip points corresponding to a hip bone area of the bovine animal; wherein the second feature vector includes the one or more hip points.

16. The electronic device according to claim 1, wherein the electronic device is configured to determine the one or more hip points by:

determining the widest bin amongst the number of bins; and determining, as part of the one or more hip points, the points that are associated with a pre-determined number of bins above and below the widest bin.

17. The electronic device according to claim 1, wherein the electronic device is configured to obtain the second sensor data by:

determining whether the second sensor data meets a criterion, and upon the second sensor data meeting the criterion, storing the second sensor data.

18. The electronic device according to claim 1, wherein the generation of the third feature vector comprises combining the first sensor data with the second sensor data using a feature reduction technique, wherein the feature reduction technique comprises an artificial neural network and/or a linear discriminant analysis.

19. A method, performed by an electronic device, for identifying a bovine animal in an environment, the method comprising:

obtaining first sensor data from a first sensor of a first type, wherein the first sensor data comprises two-dimensional image data representative of the bovine animal in the environment;

obtaining second sensor data from a second sensor of a second type, wherein the second type is different from the first type, and wherein the second sensor data is indicative of one or more distances associated with the environment;

generating, based on the first sensor data, a first feature vector;

generating, based on the second sensor data, a second feature vector, wherein the generation of the second feature vector comprises dividing the second sensor data into a number of bins associated with a width and a length along an x-axis of the second sensor, wherein the x-axis is substantially aligned with a spine of the bovine animal;

generating, based on the first feature vector and the second feature vector, a third feature vector; and identifying the bovine animal based on the third feature vector.

* * * * *